US012280753B2

(12) United States Patent
Suzuki et al.

(10) Patent No.: US 12,280,753 B2
(45) Date of Patent: Apr. 22, 2025

(54) MOTOR GEAR UNIT FOR DISC BRAKE APPARATUS AND DISC BRAKE APPARATUS

(71) Applicant: AKEBONO BRAKE INDUSTRY CO., LTD., Tokyo (JP)

(72) Inventors: Michio Suzuki, Tokyo (JP); Takeshi Kuroki, Tokyo (JP); Shinichi Yamadera, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 396 days.

(21) Appl. No.: 17/834,064

(22) Filed: Jun. 7, 2022

(65) Prior Publication Data

US 2022/0388490 A1 Dec. 8, 2022

(30) Foreign Application Priority Data

Jun. 8, 2021 (JP) .................................. 2021-095598

(51) Int. Cl.
| | |
|---|---|
| *F16D 55/226* | (2006.01) |
| *B60T 1/06* | (2006.01) |
| *B60T 13/74* | (2006.01) |
| *F16D 65/18* | (2006.01) |
| *F16D 121/24* | (2012.01) |
| *F16D 125/40* | (2012.01) |
| *F16D 125/48* | (2012.01) |
| *F16D 125/52* | (2012.01) |

(52) U.S. Cl.
CPC ............ *B60T 13/746* (2013.01); *B60T 1/065* (2013.01); *F16D 55/226* (2013.01); *F16D 65/18* (2013.01); *F16D 2121/24* (2013.01); *F16D 2125/40* (2013.01); *F16D 2125/48* (2013.01); *F16D 2125/52* (2013.01)

(58) Field of Classification Search
CPC ...... B60T 13/746; B60T 1/065; F16D 55/226; F16D 65/18; F16D 65/183; F16D 2121/24; F16D 2125/40; F16D 2125/48; F16D 2125/52
See application file for complete search history.

(56) References Cited

U.S. PATENT DOCUMENTS

| | | | | |
|---|---|---|---|---|
| 9,162,662 | B2 * | 10/2015 | Sun ...................... | B60T 13/746 |
| 9,568,058 | B2 * | 2/2017 | Sakashita .............. | F16D 55/226 |
| 10,344,813 | B2 * | 7/2019 | Kimura ................. | F16D 65/183 |
| 10,644,566 | B2 * | 5/2020 | Al-Mahshi ............. | F16D 65/22 |
| 11,136,010 | B2 * | 10/2021 | Suzuki .................... | F16D 65/18 |
| 11,535,225 | B2 * | 12/2022 | Esnee ................... | F16D 55/226 |

(Continued)

FOREIGN PATENT DOCUMENTS

| | | |
|---|---|---|
| JP | 2016-050629 A | 4/2016 |
| JP | 2018-184093 A | 11/2018 |

*Primary Examiner* — Thomas W Irvin
(74) *Attorney, Agent, or Firm* — Faegre Drinker Biddle & Reath LLP

(57) ABSTRACT

A motor gear unit for a disc brake apparatus is provided. A speed reduction mechanism is connected to a first connection portion of a motor shaft of an electric motor. A non-excited operation type brake is connected to a second connection portion of the motor shaft. In a state where the disc brake apparatus is attached to a vehicle body, the motor shaft is disposed so as to be orientated in an upper-lower direction, and the non-excited operation type brake is disposed above the electric motor.

12 Claims, 22 Drawing Sheets

(56) References Cited

U.S. PATENT DOCUMENTS

| | | | |
|---|---|---|---|
| 11,858,486 B2* | 1/2024 | Hong | B60T 13/746 |
| 2004/0195058 A1* | 10/2004 | Ina | F16D 65/18 |
| | | | 188/158 |
| 2014/0090933 A1* | 4/2014 | Sakashita | F16D 65/567 |
| | | | 188/72.4 |
| 2015/0175143 A1* | 6/2015 | Sun | F16D 65/183 |
| | | | 74/89.16 |
| 2016/0032994 A1* | 2/2016 | Sakashita | F16D 55/225 |
| | | | 188/72.3 |
| 2018/0013332 A1* | 1/2018 | Al-Mahshi | F16D 65/22 |
| 2018/0045258 A1* | 2/2018 | Kimura | F16D 65/02 |
| 2019/0063527 A1* | 2/2019 | Thomas | F16D 65/14 |
| 2019/0120311 A1* | 4/2019 | Al-Mahshi | B60T 1/065 |
| 2019/0256060 A1* | 8/2019 | Suzuki | F16D 65/18 |
| 2020/0361437 A1* | 11/2020 | Esnee | F16D 65/62 |
| 2021/0122351 A1* | 4/2021 | Hong | B60T 13/741 |
| 2023/0036745 A1* | 2/2023 | Yamaguchi | B60T 13/741 |
| 2023/0286480 A1* | 9/2023 | Kato | B60T 1/065 |
| 2023/0287948 A1* | 9/2023 | Yamadera | F16D 55/226 |
| 2024/0077120 A1* | 3/2024 | Matsubara | F16D 65/183 |

* cited by examiner

MOTOR GEAR UNIT FOR DISC BRAKE APPARATUS AND DISC BRAKE APPARATUS

CROSS-REFERENCE TO RELATED APPLICATIONS

The disclosure of Japanese Patent Application No. 2021-095598 filed on Jun. 8, 2021, including specification, drawings and claims is incorporated herein by reference in its entirety.

BACKGROUND

The present invention relates to a motor gear unit for a disc brake apparatus and a disc brake apparatus.

Since a disc brake apparatus is excellent in heat dissipation and can finely adjust a braking force during traveling, the number of cases in which the disc brake apparatus is adopted not only for front wheels of an automobile but also for rear wheels of the automobile is increased.

The disc brake apparatus can be roughly divided into a hydraulic disc brake apparatus that uses hydraulic oil to obtain a braking force and an electric disc brake apparatus that uses an actuator that can be electrically driven to obtain a braking force.

As an electric disc brake apparatus, as disclosed in JP-A-2018-184093 and the like, an electric parking brake type structure in which a braking force by a service brake is generated by feeding brake oil (fluid) into a cylinder, and a braking force by a parking brake is generated by driving an electric actuator such as a rotary-to-linear motion conversion mechanism by an electric motor is known.

In the electric parking brake type disc brake apparatus, it is necessary to maintain the braking force by the parking brake even in a state where an engine of an automobile is stopped and energization to the electric motor is stopped.

Therefore, as disclosed in JP-A-2016-50629 and the like, it is considered to provide a worm speed reduction mechanism having a self-lock function between an electric motor and a piston that presses a pad. According to such a configuration, even in a state where energization to the electric motor is stopped, the pad can be maintained in a state of being pressed against a rotor, and a braking force by a parking brake can be maintained.

Patent Literature 1: JP-A-2018-184093
Patent Literature 2: JP-A-2016-50629

SUMMARY

According to one advantageous aspect of the invention, there is provided a motor gear unit for a disc brake apparatus, including:
a housing;
an electric motor;
a speed reduction mechanism; and
a non-excited operation type brake, wherein
the housing includes a motor accommodating portion, a gear accommodating portion, and a brake accommodating portion, and is supported by and fixed to a caliper of the disc brake apparatus,
the electric motor includes a motor shaft which includes a first connection portion connected to the speed reduction mechanism on an axially one side portion and a second connection portion connected to the non-excited operation type brake on an axially another side portion, and is disposed inside the motor accommodating portion,
the speed reduction mechanism is connected to the first connection portion, transmits a rotation of the electric motor to a rotary-to-linear motion conversion mechanism disposed in a cylinder of the caliper, and is disposed inside the gear accommodating portion,
the non-excited operation type brake is connected to the second connection portion, prevents a rotation of the motor shaft during a non-energization period, and is disposed inside the brake accommodating portion, and
in a state where the disc brake apparatus is attached to a vehicle body, the motor shaft is disposed so as to be orientated in an upper-lower direction, and the non-excited operation type brake is disposed above the electric motor.

The housing may further include a first partition wall partitioning the motor accommodating portion and the gear accommodating portion.

The housing may further include a second partition wall partitioning the motor accommodating portion and the brake accommodating portion.

The speed reduction mechanism may include a worm connected to the first connection portion, a worm wheel meshed with the worm, and a plurality of gears. A rotation central axis of the worm wheel and rotation central axes of the plurality of gears may be disposed substantially parallel to a central axis of the rotary-to-linear motion conversion mechanism.

The speed reduction mechanism may include the worm connected to the first connection portion, the worm wheel meshed with the worm, a plurality of final gears connected directly or via another member to the rotary-to-linear motion conversion mechanism, and a power distribution mechanism configured to distribute and transmit an input power to the plurality of final gears.

Two final gears may be provided, and an imaginary line orthogonal to a rotation central axis of each of the two final gears and the motor shaft may be arranged substantially parallel to each other.

According to another advantageous aspect of the invention, there is provided a disc brake apparatus including:
a caliper including a cylinder on an axially inner side of a rotor;
a piston fitted into the cylinder;
a rotary-to-linear motion conversion mechanism, disposed in the cylinder, and configured to push out the piston toward the rotor by converting a rotary motion into a linear motion; and
a motor gear unit, supported by and fixed to the caliper, and configured to drive the rotary-to-linear motion conversion mechanism, wherein
the motor gear unit is the motor gear unit for the disc brake apparatus according to the one aspect of the invention.

A plurality of the cylinders, a plurality of the pistons, and a plurality of the rotary-to-linear motion conversion mechanisms may be provided.

The rotary-to-linear motion conversion mechanism may include a spindle and a nut, and the speed reduction mechanism may transmit rotation of the electric motor to the spindle.

DETAILED DESCRIPTION OF EXEMPLIFIED EMBODIMENTS

Figure 1:
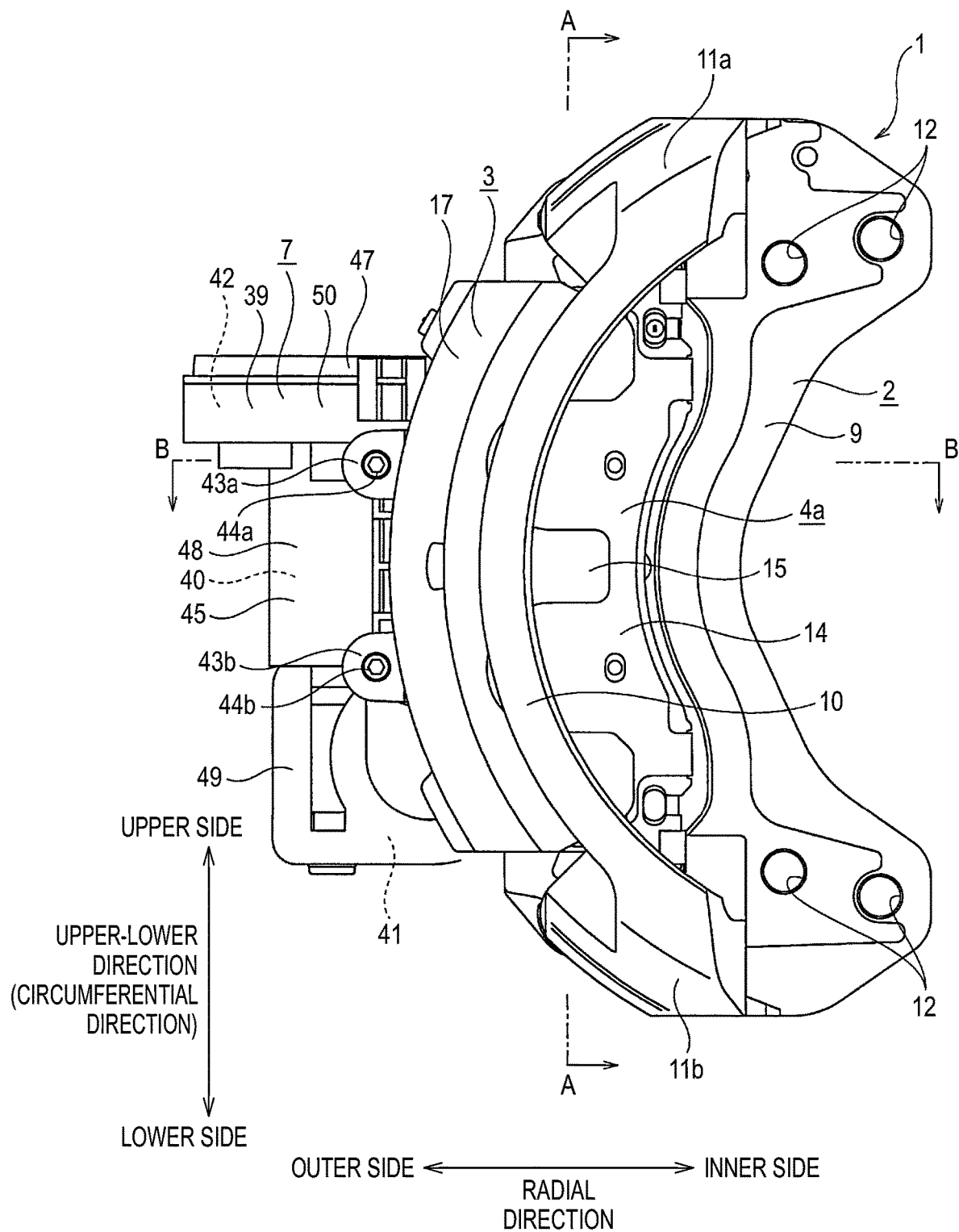
FIG. 1 is a front view of a disc brake apparatus according to a first example of an embodiment when viewed from an axially outer side in a posture in a state where the disc brake apparatus is attached to a suspension device.

As compared with a worm speed reduction mechanism not having the self-lock function, the worm speed reduction mechanism having the self-lock function is likely to have a large frictional resistance (energy loss) and low input/output characteristics (efficiency).

In view of such circumstances, the inventors of the present invention have considered that a braking force by a parking brake is maintained in a state where the energization to an electric motor is stopped by using a non-excited operation type brake instead of the worm speed reduction mechanism having the self-lock function. Then, it is considered to incorporate the non-excited operation type brake into a motor gear unit (MGU), that is, to accommodate the non-excited operation type brake in a housing that accommodates the electric motor and the speed reduction mechanism.

However, if the non-excited operation type brake is simply accommodated in the housing that accommodates the electric motor and the speed reduction mechanism, a lubricant such as grease for lubricating the speed reduction mechanism may adhere to the non-excited operation type brake. Therefore, when energization to the electric motor is stopped, the braking force by the parking brake may not be sufficiently maintained.

The present invention has been made to solve the above-described problems, and an object thereof is to provide a motor gear unit for a disc brake apparatus and the disc brake apparatus that can prevent a lubricant from adhering to a non-excited operation type brake.

First Example of Embodiment

A first example of an embodiment will be described with reference to FIGS. 1 to 23.

Overall Configuration of Disc Brake Apparatus

The disc brake apparatus 1 of the present example is an electric parking brake type disc brake apparatus, and has both a function as a hydraulic service brake and a function as an electric parking brake.

The disc brake apparatus 1 is a floating type disc brake apparatus, and includes a support 2, a caliper 3, a pair of pads 4a and 4b (an outer pad 4a and an inner pad 4b), two pistons 5a and 5b (a first piston 5a and a second piston 5b), two rotary-to-linear motion conversion mechanisms 6a and 6b (a first rotary-to-linear motion conversion mechanism 6a and a second rotary-to-linear motion conversion mechanism 6b), and a motor gear unit 7.

The present example shows a case where the present invention is applied to a disc brake apparatus incorporated in a relatively large vehicle. Therefore, the disc brake apparatus includes two pistons and two rotary-to-linear motion conversion mechanisms, but when the disc brake apparatus is applied to a disc brake apparatus for a general passenger vehicle, one piston and one rotary-to-linear motion conversion mechanism can be provided.

The disc brake apparatus 1 obtains a braking force by the service brake by feeding brake oil (pressure oil) that is hydraulic oil to a first cylinder 20a and a second cylinder 20b provided at the caliper 3. On the contrary, the disc brake apparatus 1 obtains a braking force by the parking brake by driving the first rotary-to-linear motion conversion mechanism 6a and the second rotary-to-linear motion conversion mechanism 6b by the motor gear unit 7 without using the hydraulic oil.

In the present example, unless otherwise specified, an axial direction, a circumferential direction, and a radial direction refer to an axial direction, a circumferential direction, and a radial direction of a disc-shaped rotor 8 (see FIG. 7) that rotates together with a wheel. A front-back direction in FIGS. 1, 2, 8, 9, 14, and 18, an upper-lower direction in FIGS. 3, 7, and 10, and a left-right direction in FIG. 6 correspond to the axial direction. A central side of a vehicle body in a state of being attached to the vehicle body is referred to as an axially inner side, and an outer side of the vehicle body in the state of being attached to the vehicle body is referred to as an axially outer side. Further, an upper-lower direction in FIGS. 1, 2, 6, 8, 9, 11, 14, 17, 18, and 21 and a front-back direction in FIGS. 3, 7, and 10 correspond to the circumferential direction, and correspond to the upper-lower direction in the state of being attached to the vehicle body. Further, a left-right direction in FIGS. 1 to 3, FIGS. 7 to 10, and FIGS. 14 and 18 and a front-back direction in FIG. 6 correspond to the radial direction. A left side in FIGS. 1, 3, 7, and 8 and a right side in FIGS. 2, 9, 14, and 18 are radially outer sides, and a right side in FIGS. 1, 3, 7, and 8 and a left side in FIGS. 2, 9, 14, and 18 are radially inner sides. Further, in the present specification and claims, the upper-lower direction is not limited to a vertical direction, and includes a direction inclined by, for example, about 45 degrees with respect to the vertical direction.

Support

The support 2 is a cast product of an iron-based alloy such as cast iron, and includes a support base portion 9 disposed on an axially inner side of the rotor 8, an outer coupling portion 10 disposed on an axially outer side of the rotor 8, and a pair of coupling arm portions 11a and 11b that respectively couple end portions on circumferentially both outer sides of the support base portion 9 and end portions on circumferentially both outer sides of the outer coupling portion 10 in the axial direction. A guide hole (not shown) that opens axially inward is formed in a radially outer portion (rotor path portion) of each of the coupling arm portions 11a and 11b. The support 2 is fixed to a suspension device that constitutes the vehicle body by using a plurality of (four in the shown example) attachment holes 12 formed in a radially inner portion of the support base portion 9.

Figure 2:
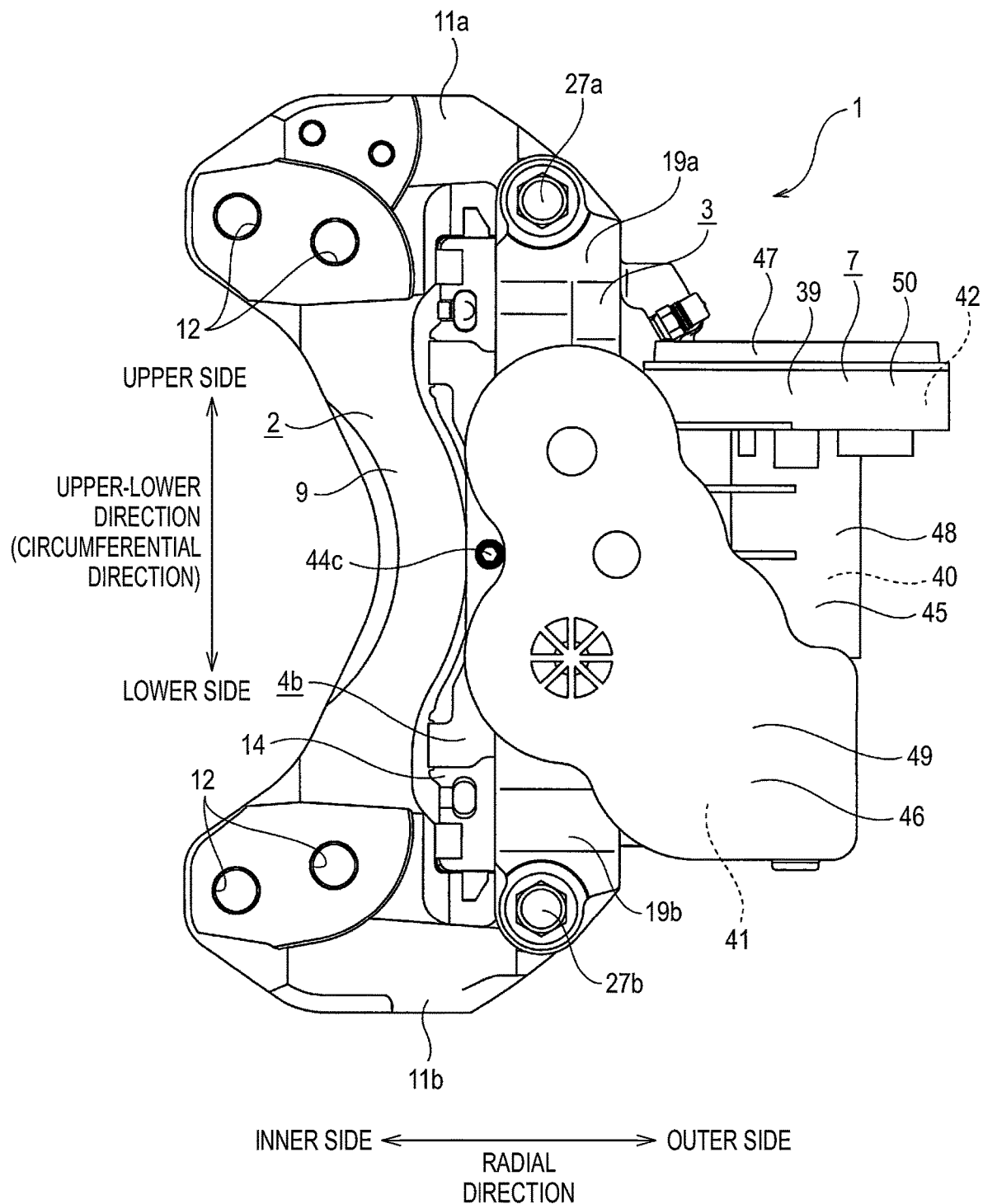
FIG. 2 is a rear view of the disc brake apparatus according to the first example of the embodiment when viewed from an axially inner side in the posture in the state where the disc brake apparatus is attached to the suspension device.
Figure 3:
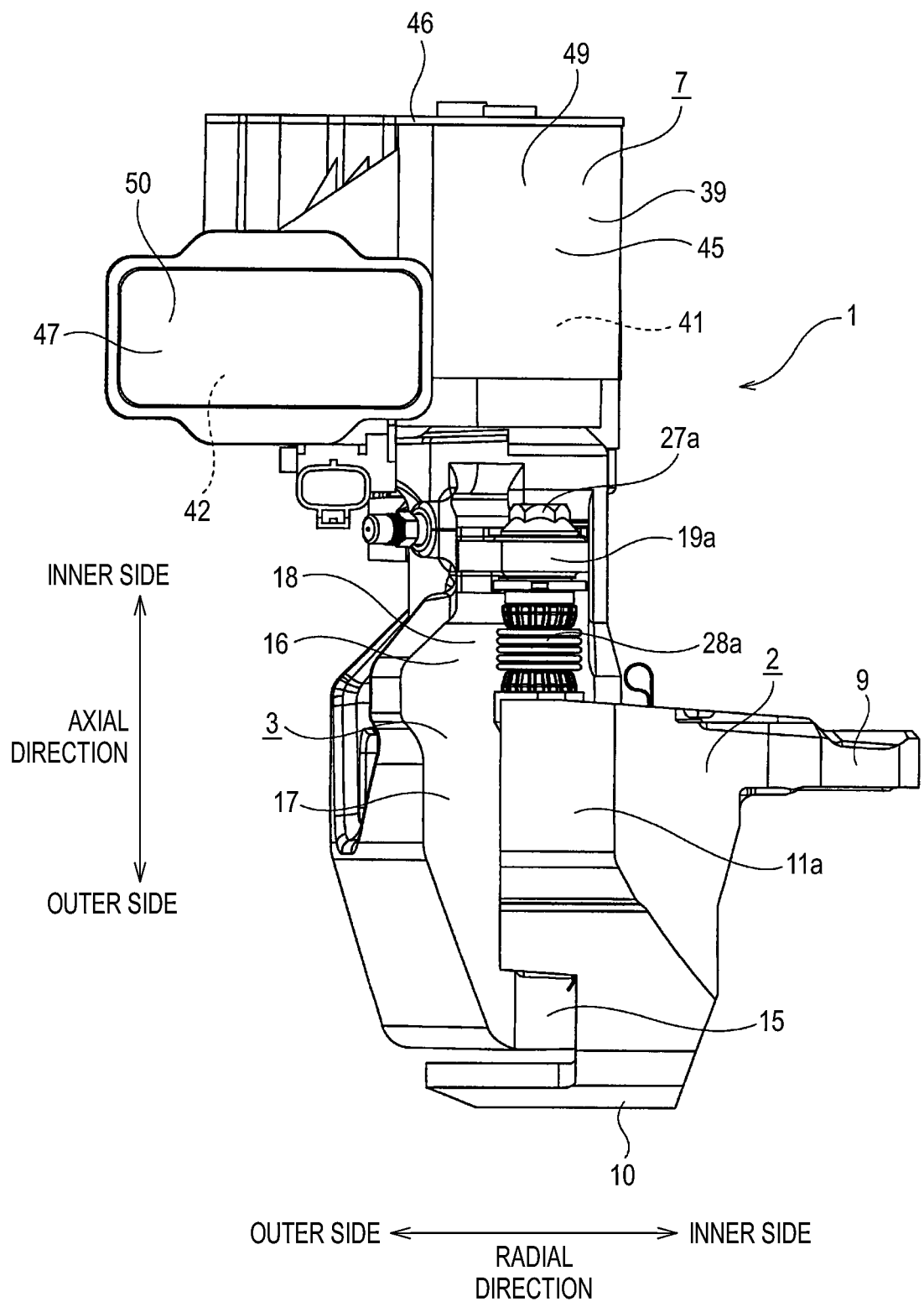
FIG. 3 is a plan view of the disc brake apparatus according to the first example of the embodiment when viewed from an upper side in FIG. 1.
Figure 4:
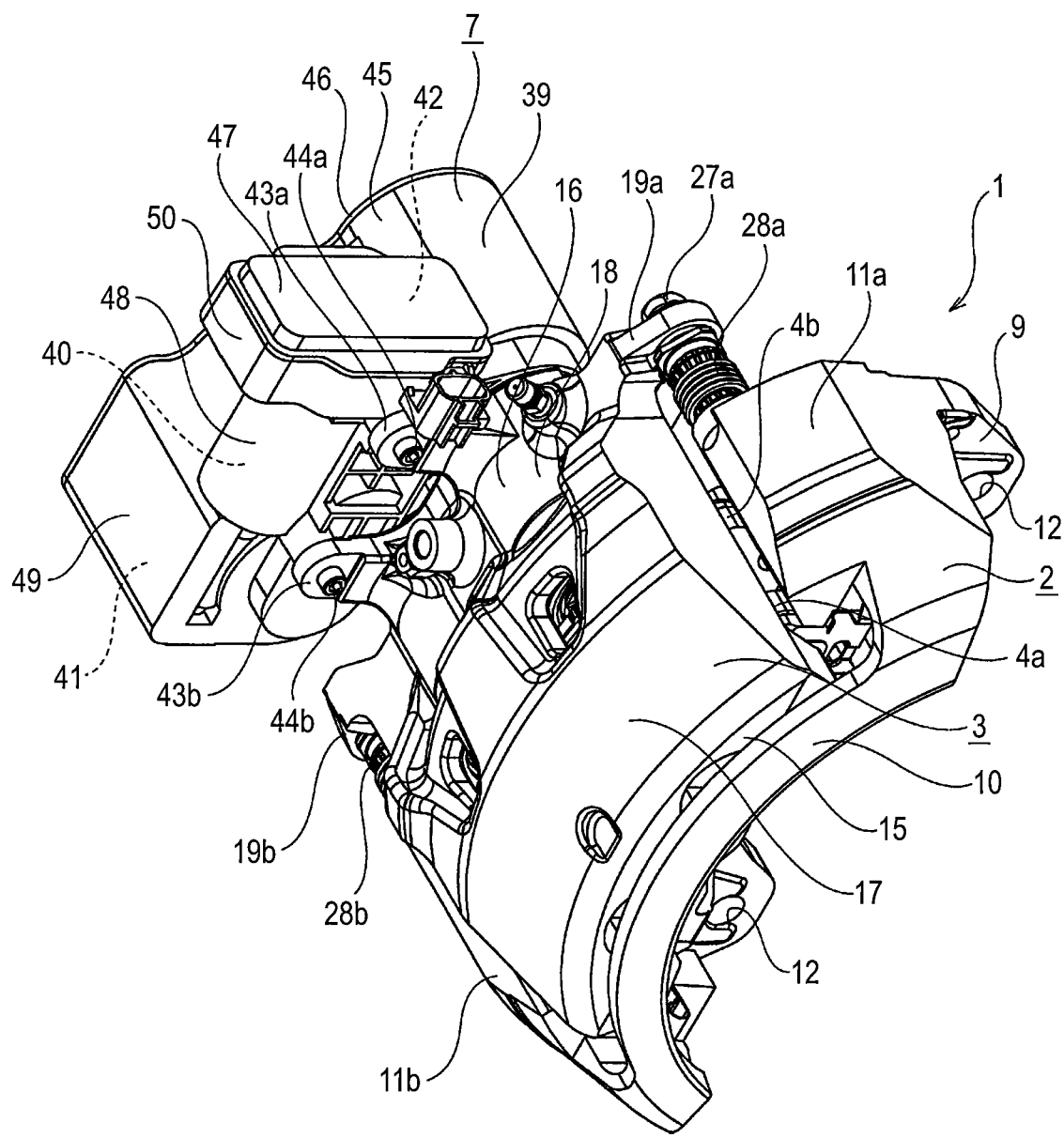
FIG. 4 is a perspective view of the disc brake apparatus according to the first example of the embodiment when viewed from an axially outer side and a radially outer side.
Figure 5:
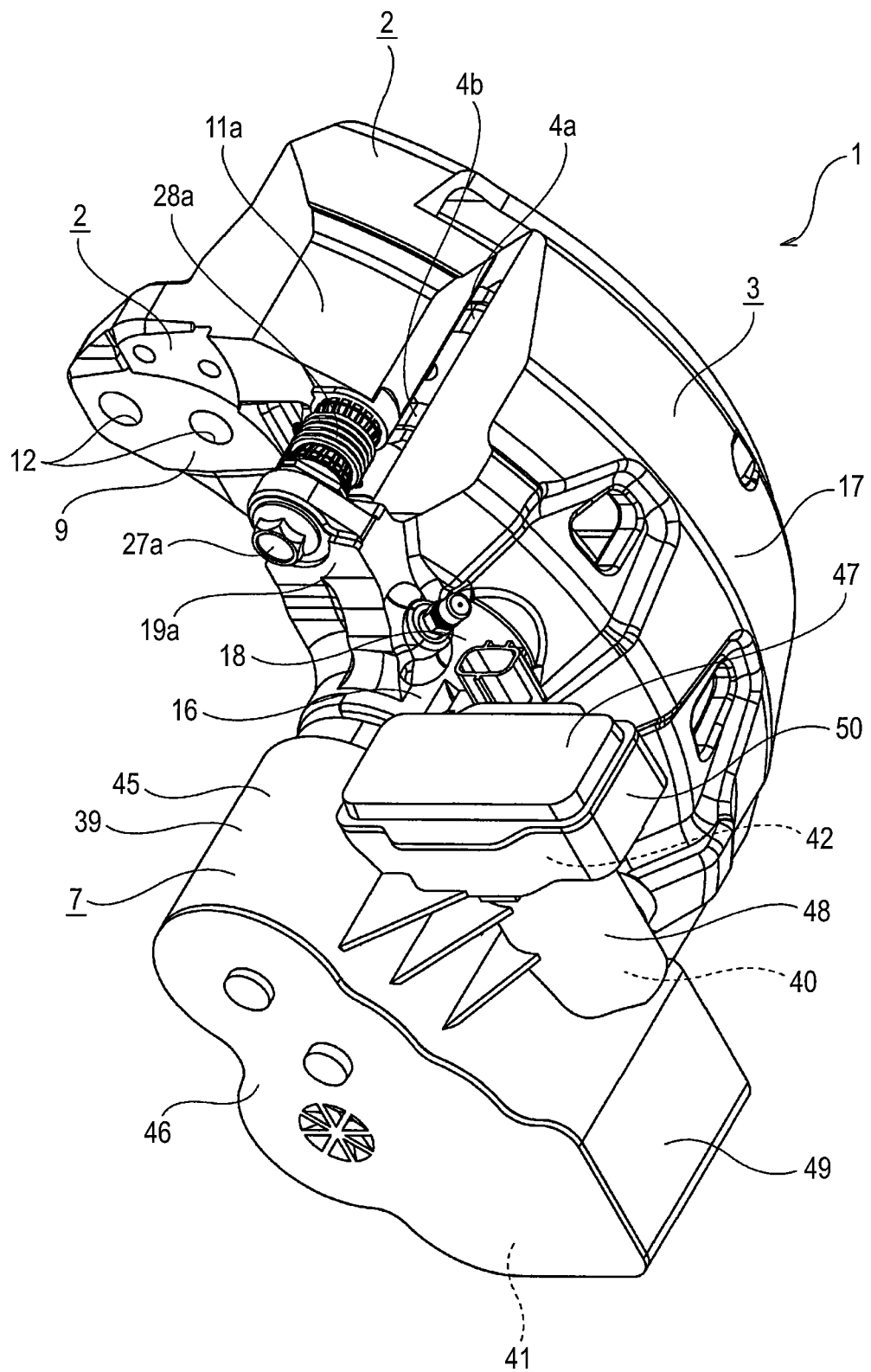
FIG. 5 is a perspective view of the disc brake apparatus according to the first example of the embodiment when viewed from an axially inner side and a radially outer side.

In the disc brake apparatus 1 of the present example, in a state where the support 2 is fixed to the suspension device, as shown in FIGS. 1 and 2, one coupling arm portion 11a is disposed on an upper side in the upper-lower direction, and the other coupling arm portion 11b is disposed on a lower side in the upper-lower direction.

Outer Pad and Inner Pad

The outer pad 4a and the inner pad 4b are arranged on axially both sides of the rotor 8. Specifically, the outer pad 4a is disposed on an axially outer side of the rotor 8, and is supported so as to be displaceable with respect to the support 2 in the axial direction. Further, the inner pad 4b is disposed on an axially inner side of the rotor 8, and is supported so as to be displaceable with respect to the support 2 in the axial direction.

Each of the outer pad 4a and the inner pad 4b includes a lining (friction material) 13 and a metal-made back plate (pressure plate) 14 that supports a back surface of the lining 13.

Caliper

The caliper 3 is made of an aluminum-based alloy or an iron-based alloy and has an inverted U-shape. The caliper 3 includes a pressing portion 15 on an axially outer portion and a clamp base portion 16 on an axially inner portion. Further, the caliper 3 includes a bridge portion 17 that is disposed on the radially outer side of the rotor 8 and couples the pressing portion 15 and the clamp base portion 16 in the axial direction.

Figure 6:
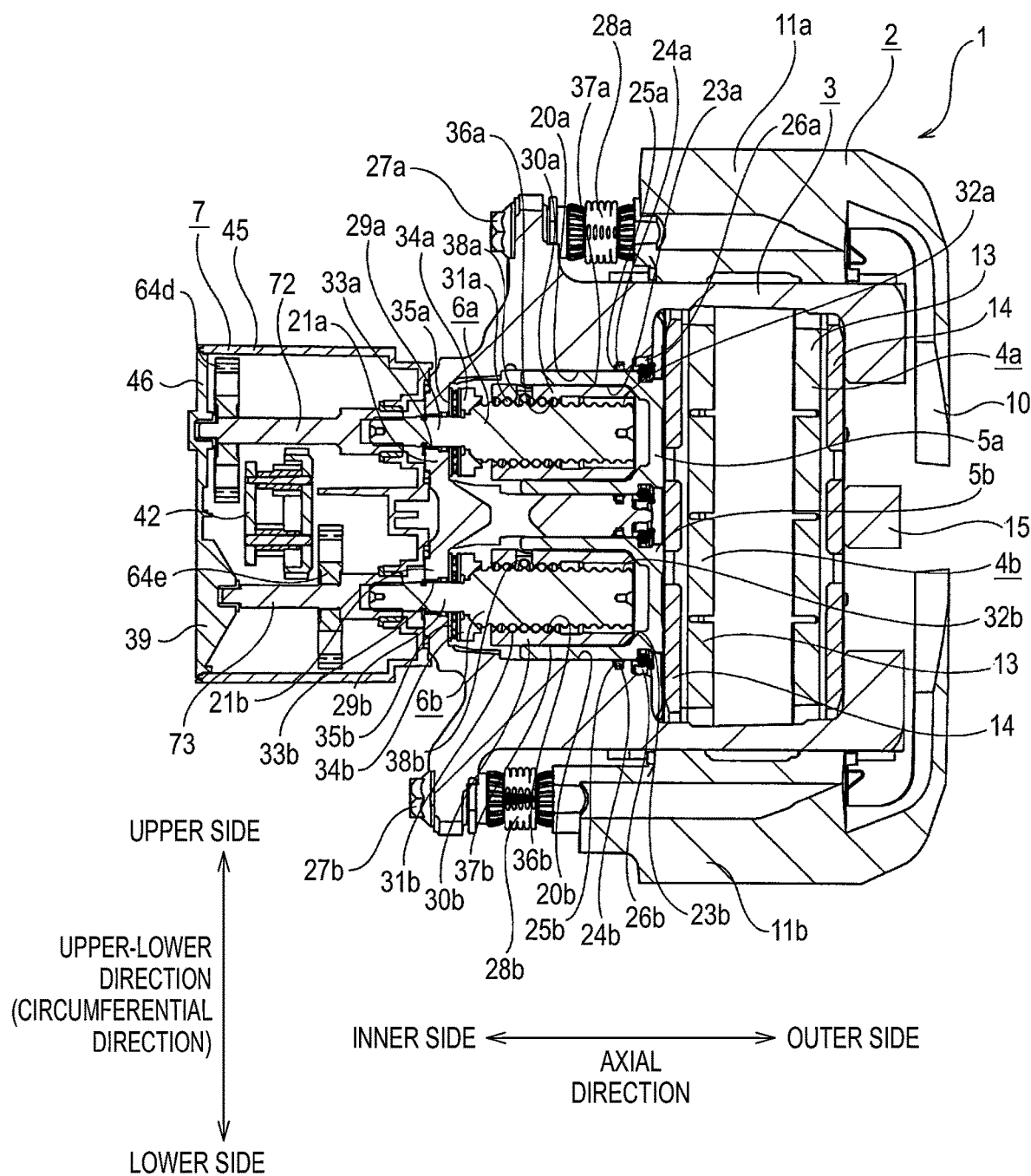
FIG. 6 is a cross-sectional view taken along a line A-A in FIG. 1.

The clamp base portion 16 includes a base portion main body 18 and a pair of arm portions 19a and 19b that extend from the base portion main body 18 to circumferentially both outer sides. The base portion main body 18 includes the first cylinder 20a and the second cylinder 20b, each of which is a substantially cylindrical space therein. The first cylinder 20a and the second cylinder 20b are opened to an axially outer side, but openings on an axially inner side are closed by bottom portions 21a and 21b. As shown in FIG. 6, in a state where the disc brake apparatus 1 is attached to the suspension device, the first cylinder 20a and the second cylinder 20b are arranged in the upper-lower direction.

The first piston 5a is fitted into the first cylinder 20a, and the second piston 5b is fitted into the second cylinder 20b. Each of the first piston 5a and the second piston 5b is made of carbon steel, such as S10C or S45C, and is formed in a bottomed cylindrical shape.

Female splines 23a and 23b are provided on inner peripheral surfaces of the first piston 5a and the second piston 5b. A portion between an outer peripheral surface of the first piston 5a and an inner peripheral surface of the first cylinder 20a and a portion between an outer peripheral surface of the second piston 5b and an inner peripheral surface of the second cylinder 20b are sealed by annular piston seals 24a and 24b. The piston seals 24a and 24b are mounted in seal grooves 25a and 25b formed in inner peripheral surfaces of axially outer portions of the first cylinder 20a and the second cylinder 20b.

The axially outer portions of the first piston 5a and the second piston 5b are prevented from rotating with respect to the back plate 14 of the inner pad 4b by a rotation preventing mechanism (not shown). A piston boot 26a is bridged over a portion between an axially outer portion of the outer peripheral surface of the first piston 5a and an opening edge portion of the first cylinder 20a on an axially outer side, and a piston boot 26b is bridged over a portion between an axially outer portion of the outer peripheral surface of the second piston 5b and an opening edge portion of the second cylinder 20b on an axially outer side.

The caliper 3 is supported so as to be displaceable with respect to the support 2 in the axial direction. For this purpose, end portions of guide pins 27a and 27b on an axially inner side are fixed to the pair of arm portions 19a and 19b that are provided in the clamp base portion 16, and end portions and intermediate portions of the guide pins 27a and 27b on an axially outer side are inserted into guide holes formed in the pair of coupling arm portions 11a and 11b that constitute the support 2 so as to be relatively displaceable in the axial direction. Further, boots 28a and 28b are bridged between outer peripheral surfaces of the guide pins 27a and 27b and opening portions of the guide holes.

Rotary-to-Linear Motion Conversion Mechanism

Figure 7:
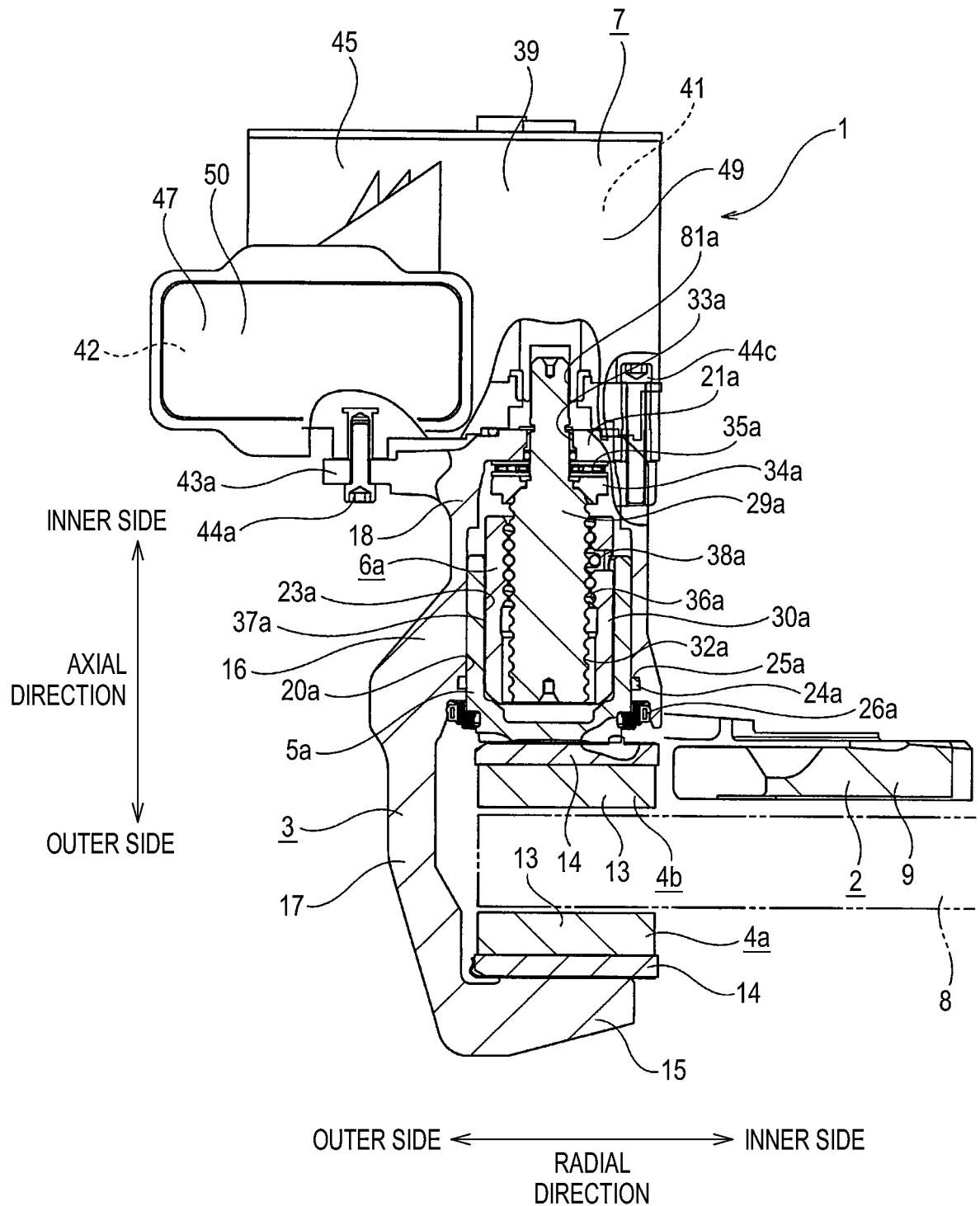
FIG. 7 is a cross-sectional view taken along a line B-B in FIG. 1.
Figure 8:
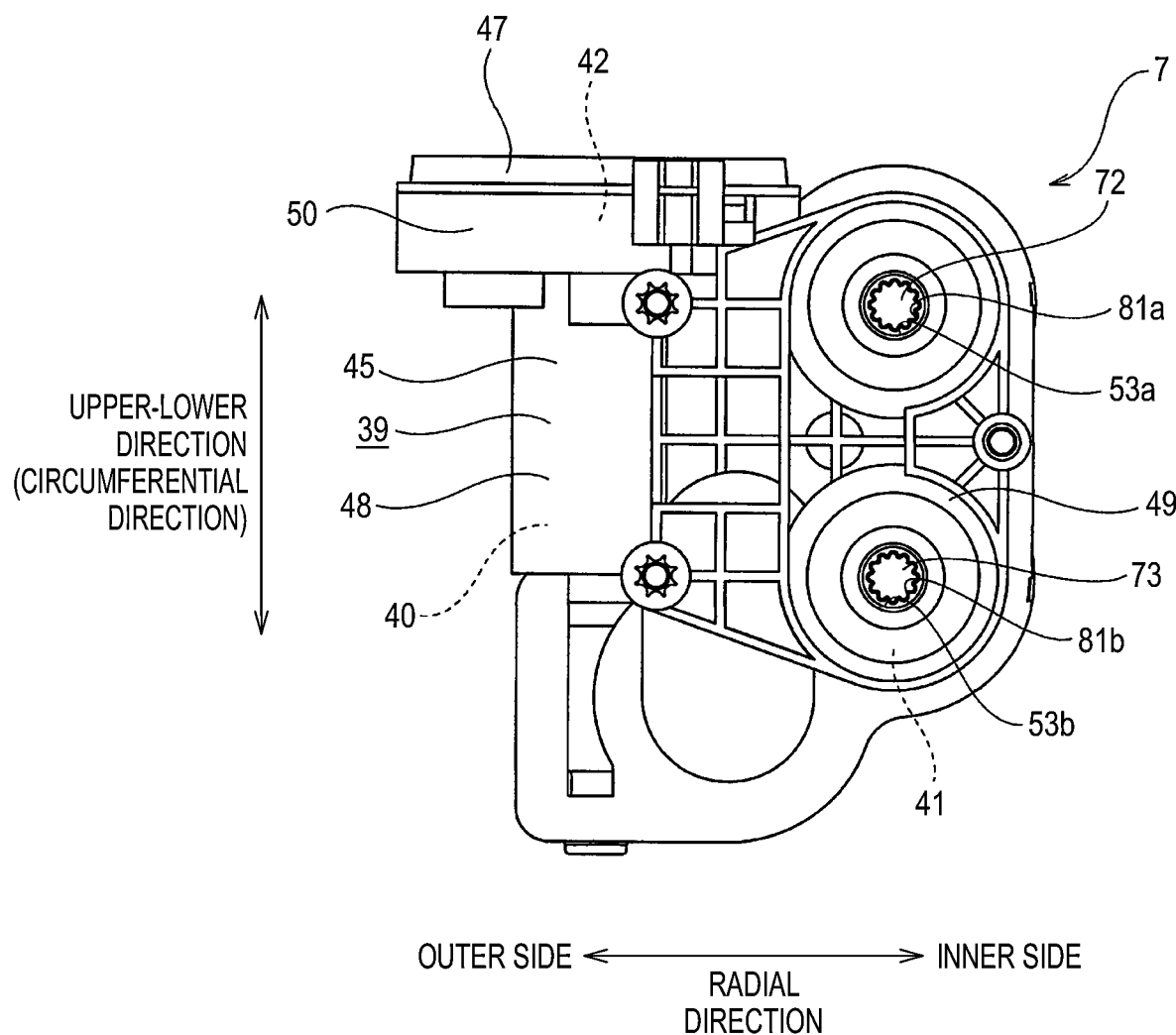
FIG. 8 is a front view of a motor gear unit removed from the disc brake apparatus according to the first example of the embodiment when viewed from an axially outer side.
Figure 9:
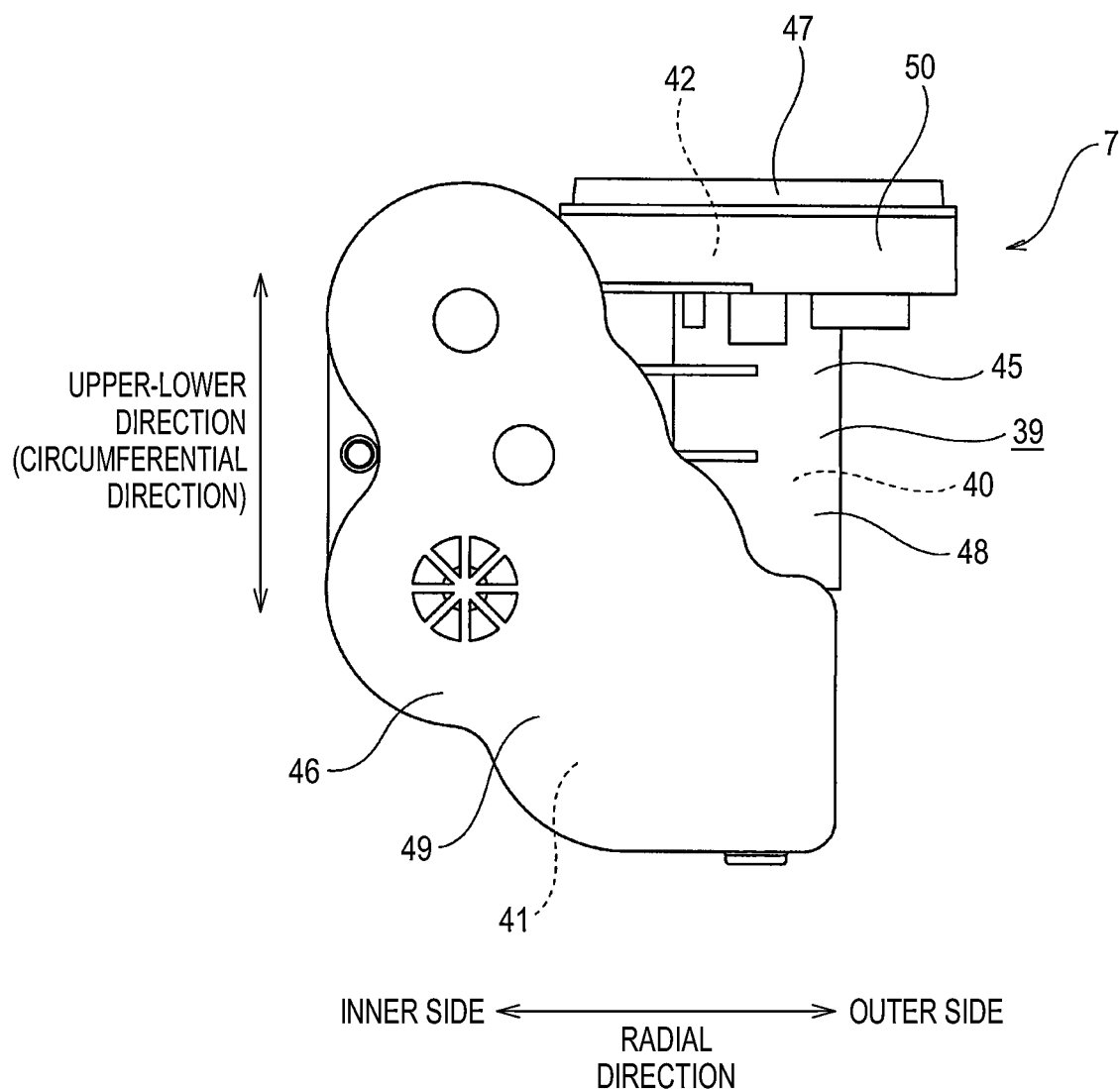
FIG. 9 is a rear view of the motor gear unit removed from the disc brake apparatus according to the first example of the embodiment when viewed from an axially inner side.
Figure 10:
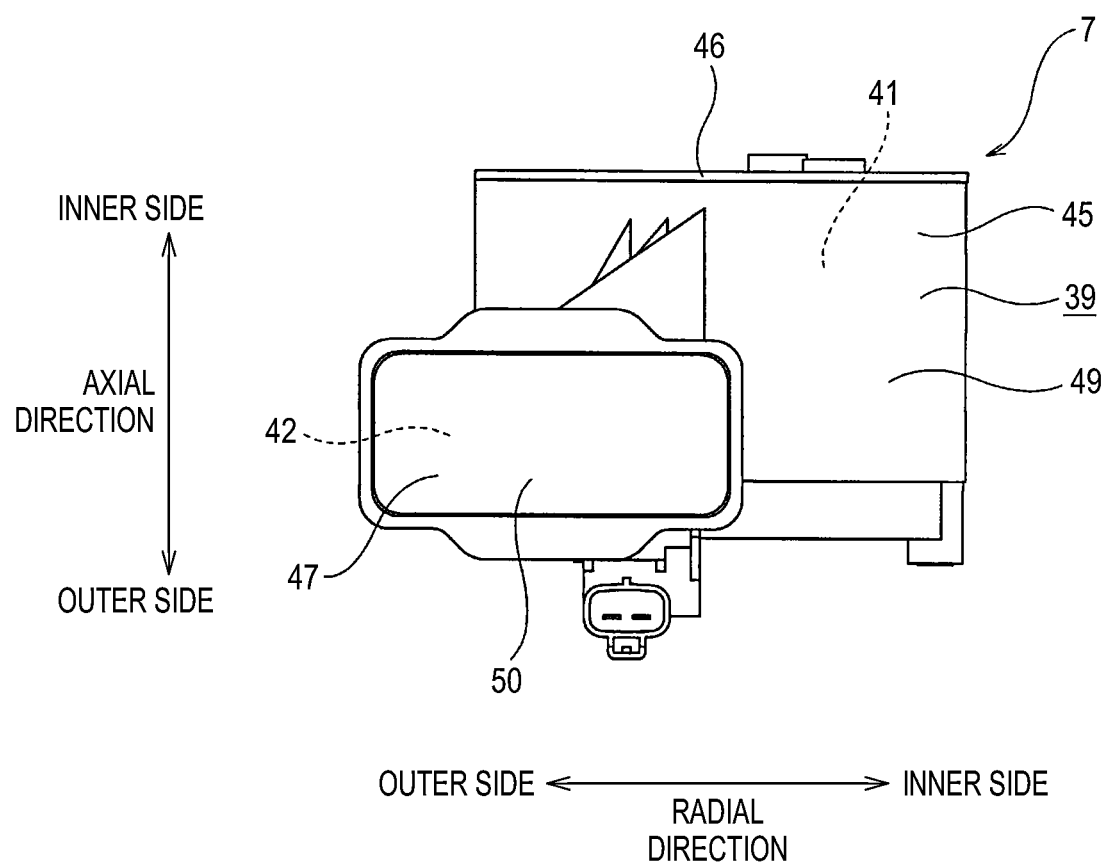
FIG. 10 is a plan view of the motor gear unit according to the first example of the embodiment when viewed from an upper side in FIG. 8.
Figure 11:
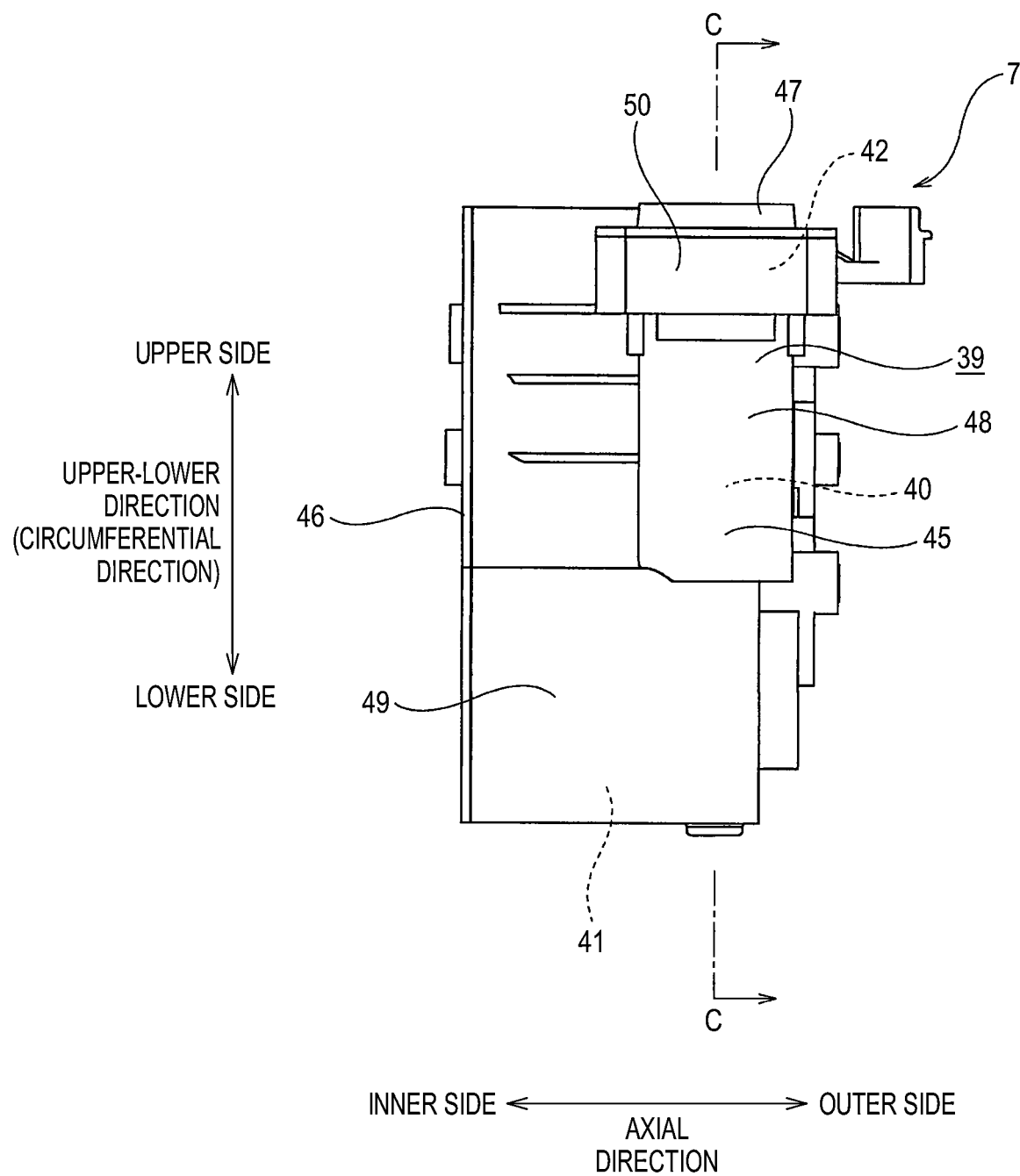
FIG. 11 is a side view of the motor gear unit according to the first example of the embodiment when viewed from a right side in FIG. 9.

As shown in FIGS. 6 and 7, the first rotary-to-linear motion conversion mechanism 6a and the second rotary-to-linear motion conversion mechanism 6b are feed screw mechanisms (ball screw devices) that convert rotary motion into linear motion and that change an overall length in the axial direction during operation, and respectively include spindles 29a and 29b that are rotary members, nuts 30a and 30b that are linear motion members, and a plurality of balls 31a and 31b. The first rotary-to-linear motion conversion mechanism 6a pushes out the first piston 5a toward the rotor 8, and the second rotary-to-linear motion conversion mechanism 6b pushes out the second piston 5b toward the rotor 8. When the present invention is carried out, it is also possible to use a sliding feed screw device in which the spindle and the nut are in direct contact with each other without a ball interposed therebetween.

The spindles 29a and 29b respectively include spiral shaft-side ball screw grooves 32a and 32b in outer peripheral surfaces ranging from tip end portions (axially outer portions) to intermediate portions. Base end portions (axially inner portions) of the spindles 29a and 29b are inserted through through holes 33a and 33b formed in the bottom portions 21a and 21b of the clamp base portion 16, and are connected to tip end portions of a first output shaft 72 and a second output shaft 73, which will be described later, so as not to be relatively rotatable.

Annular support rings 34a and 34b are fitted onto portions near the base ends of the spindles 29a and 29b so as not to be relatively rotatable. Thrust bearings 35a and 35b are arranged between an axially inner surface of the support rings 34a and 34b and an axially outer surface of the bottom portions 21a and 21b. Accordingly, axial loads (axial forces) that act on the spindles 29a and 29b can be supported by the bottom portions 21a and 21b, and the spindles 29a and 29b can be relatively rotated with respect to the bottom portions 21a and 21b.

The nuts 30a and 30b respectively include spiral nut-side ball screw grooves 36a and 36b in inner peripheral surfaces, and male splines 37a and 37b on outer peripheral surfaces. In a state where the nut 30a is disposed inside the first piston 5a, the male spline 37a is spline-engaged with the female spline 23a provided in the first piston 5a. Further, in a state where the nut 30b is disposed inside the second piston 5b, the male spline 37b is spline-engaged with the female spline 23b provided in the second piston 5b. Accordingly, the nut 30a is engaged with the first piston 5a so as to be relatively displaceable in the axial direction and so as not to be relatively rotatable, and the nut 30b is engaged with the second piston 5b so as to be relatively displaceable in the axial direction and so as not to be relatively rotatable.

The plurality of balls 31a and 31b are rotatably arranged inside a spiral load path formed between the shaft-side ball screw grooves 32a and 32b and the nut-side ball screw grooves 36a and 36b. A start point and an end point of the load path are connected by circulation components 38a and 38b fixed to the nuts 30a and 30b.

The first rotary-to-linear motion conversion mechanism 6a and the second rotary-to-linear motion conversion mechanism 6b of the present example move the nuts 30a and 30b in the axial direction by rotationally driving the spindles 29a and 29b. Specifically, when the spindles 29a and 29b are rotationally driven in a forward rotation direction, the nuts 30a and 30b are moved in a direction approaching the rotor 8 (axially outward). On the contrary, when the spindles 29a and 29b are rotationally driven in a reverse rotation direction, the nuts 30a and 30b are moved in a direction away from the rotor 8 (axially inward).

Motor Gear Unit

The motor gear unit (MGU, electric drive device) 7 is for electrically driving the first rotary-to-linear motion conversion mechanism 6a and the second rotary-to-linear motion conversion mechanism 6b, and includes a housing 39, an electric motor 40, a speed reduction mechanism 41, and a non-excited operation type brake 42.

Housing

The housing 39 is made of synthetic resin or metal, and is supported by and fixed to the clamp base portion 16 that constitutes the caliper 3. Specifically, the housing 39 is supported by and fixed to an axially inner side of the clamp base portion 16 by using attachment bolts 44a and 44b inserted through a pair of attachment flange portions 43a and 43b provided on an outer peripheral surface of the clamp base portion 16 and an attachment bolt 44c inserted through a radially inner portion of the housing 39 in the axial direction.

The housing 39 includes a housing main body 45, a closing plate portion 46, and a lid body 47. The housing 39 includes a motor accommodating portion 48, a gear accommodating portion 49, and a brake accommodating portion 50 each having a hollow shape.

The motor accommodating portion 48 is a portion that accommodates the electric motor 40 therein. In the shown example, the motor accommodating portion 48 has a cylindrical shape having an inner diameter slightly larger than an outer diameter of a motor main body 57 (described later) that constitutes the electric motor 40. A central axis of the motor accommodating portion 48 is disposed toward the circumferential direction. In the present example, in a state where the disc brake apparatus 1 is attached to the suspension device, the central axis of the motor accommodating portion 48 is disposed toward the upper-lower direction.

The gear accommodating portion 49 is a portion that accommodates the speed reduction mechanism 41 therein. In the shown example, the gear accommodating portion 49 is configured as a housing having a larger volume than that of the motor accommodating portion 48.

Figure 17:
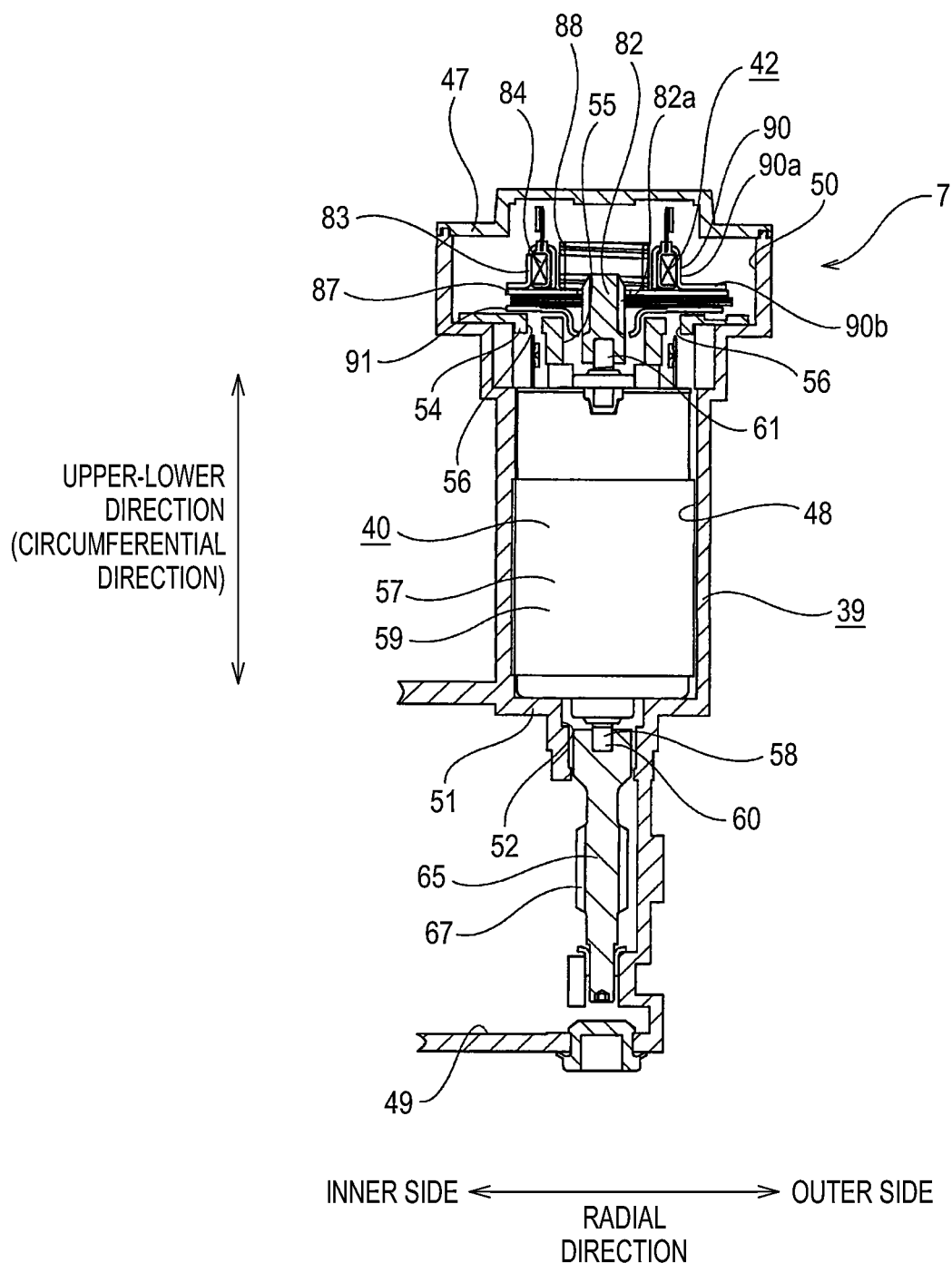
FIG. 17 is a view corresponding to a cross section taken along a line C-C in FIG. 11.
Figure 18:
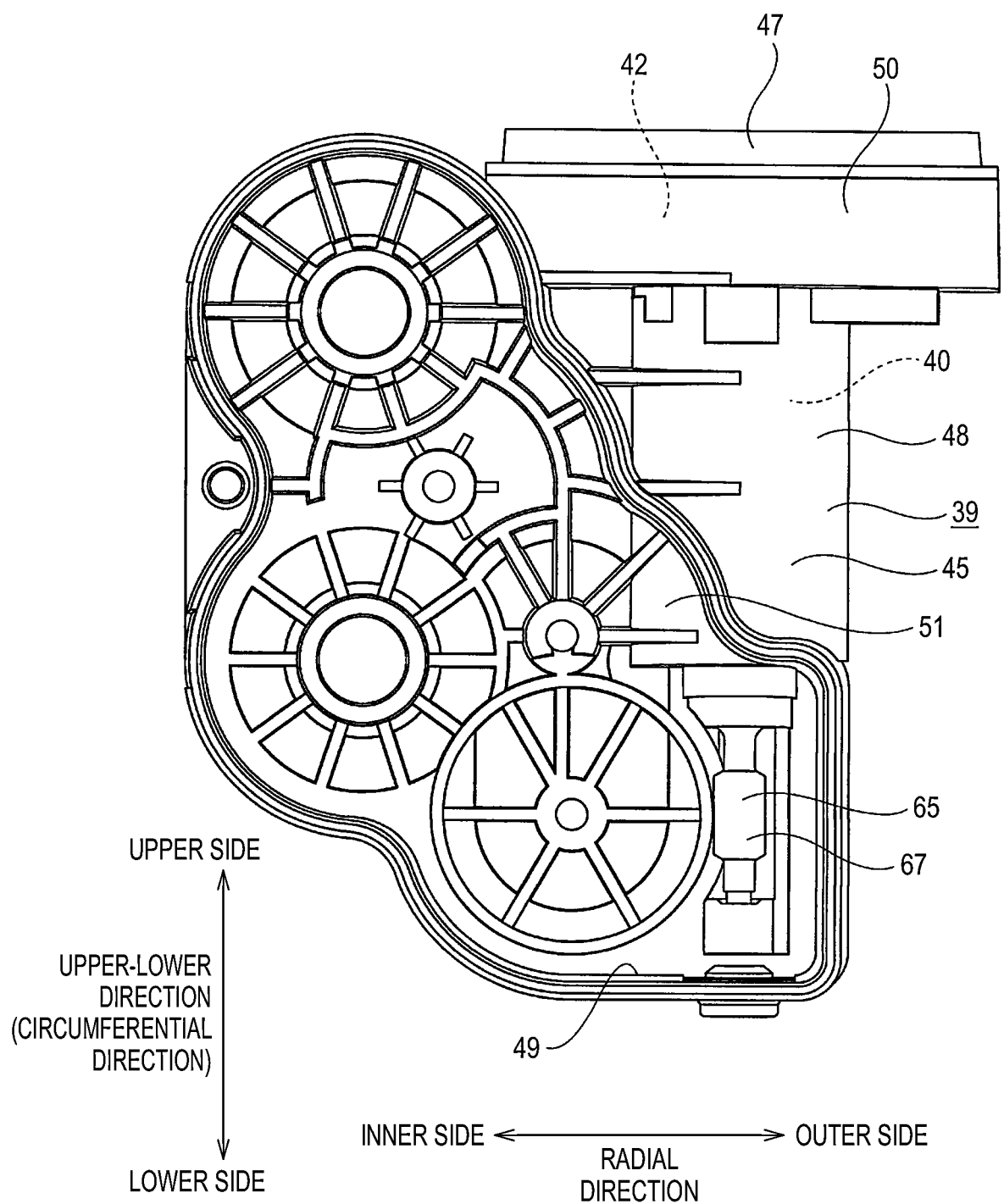
FIG. 18 is a diagram showing the motor gear unit according to the first example of the embodiment with a speed reduction mechanism other than a worm removed from a state shown in FIG. 14.
Figure 19:
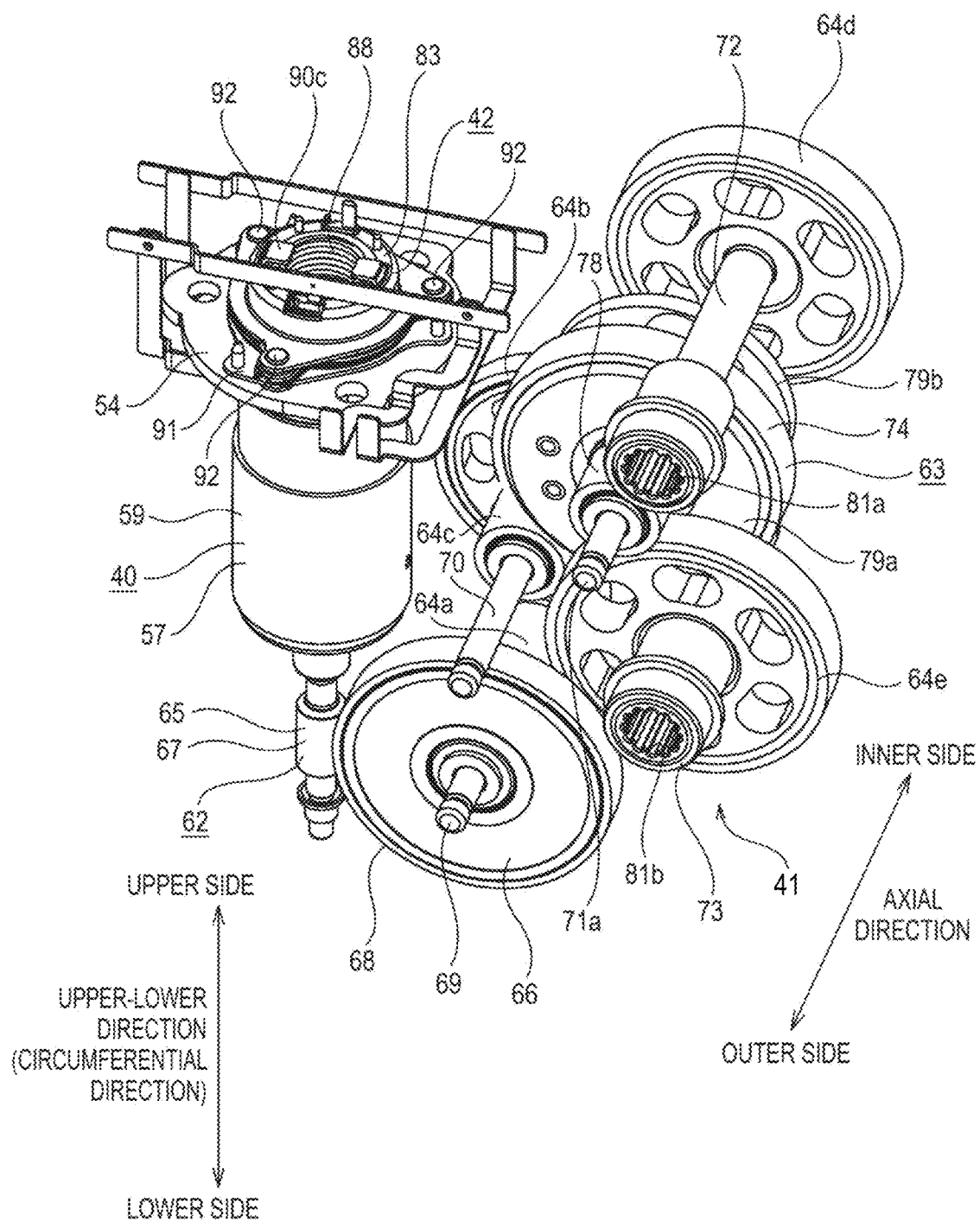
FIG. 19 is a perspective view showing the motor gear unit according to the first example of the embodiment with a housing omitted.
Figure 20:
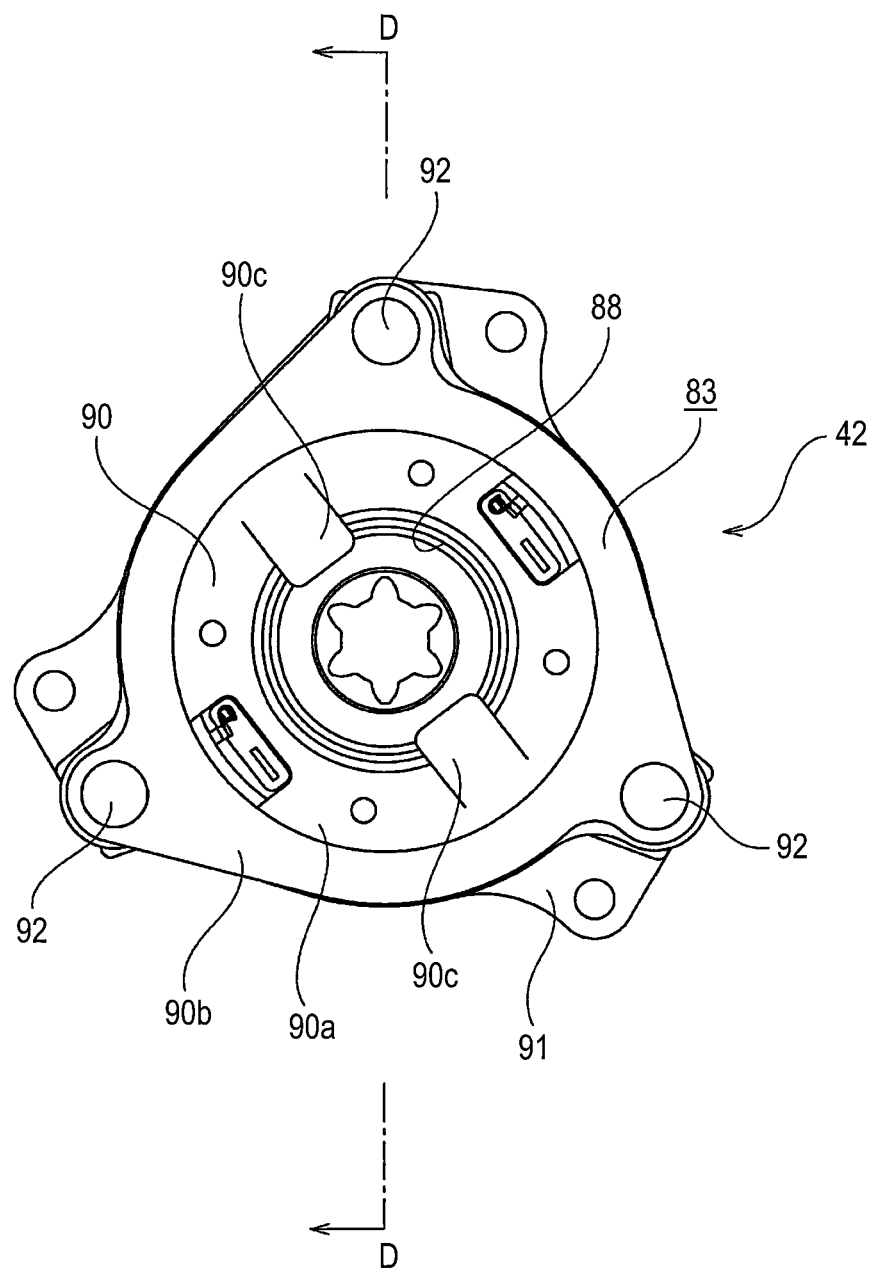
FIG. 20 is a plan view showing a non-excited operation type brake that constitutes the motor gear unit according to the first example of the embodiment.
Figure 21:
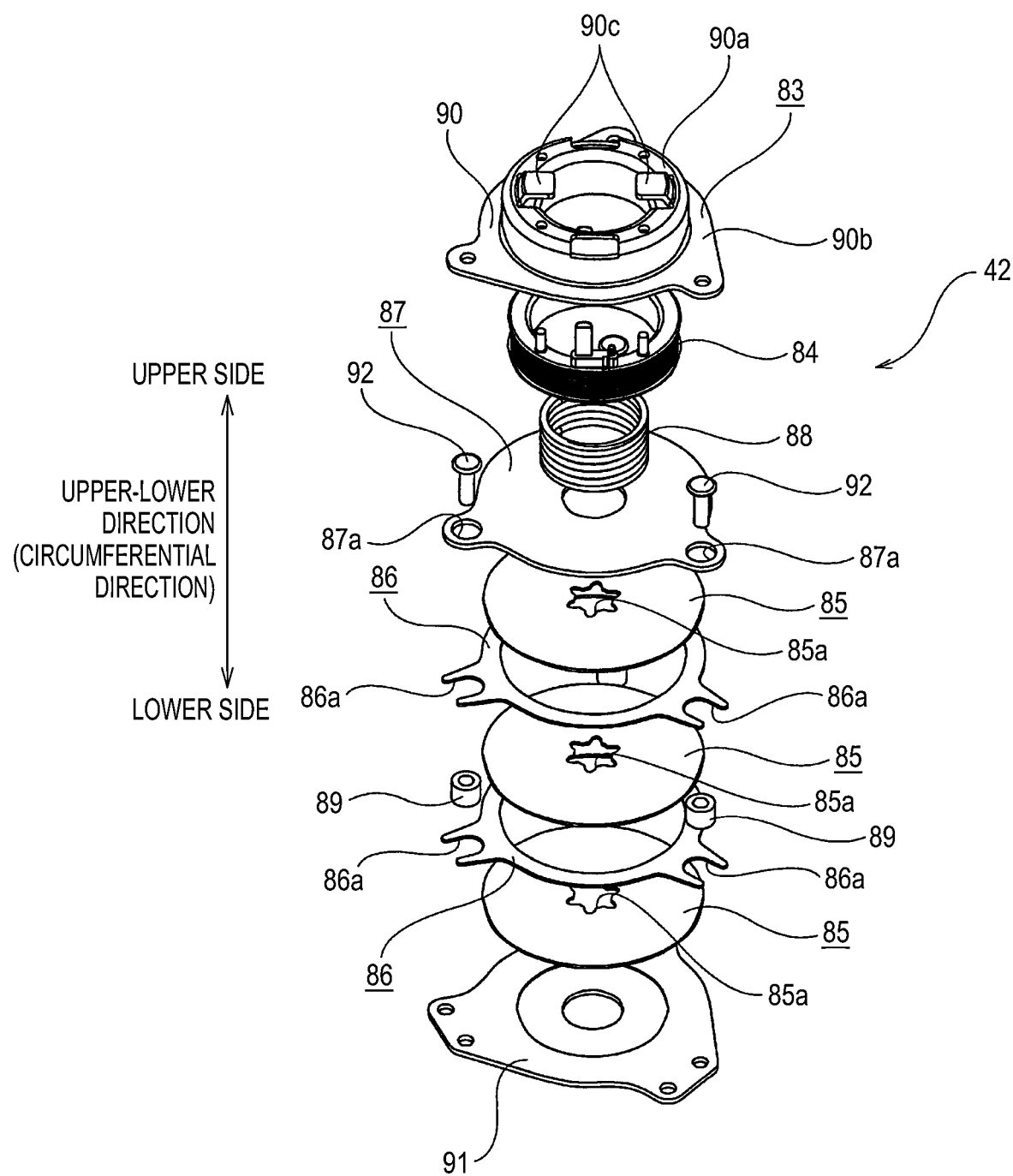
FIG. 21 is an exploded perspective view of the non-excited operation type brake that constitutes the motor gear unit according to the first example of the embodiment.
Figure 22:
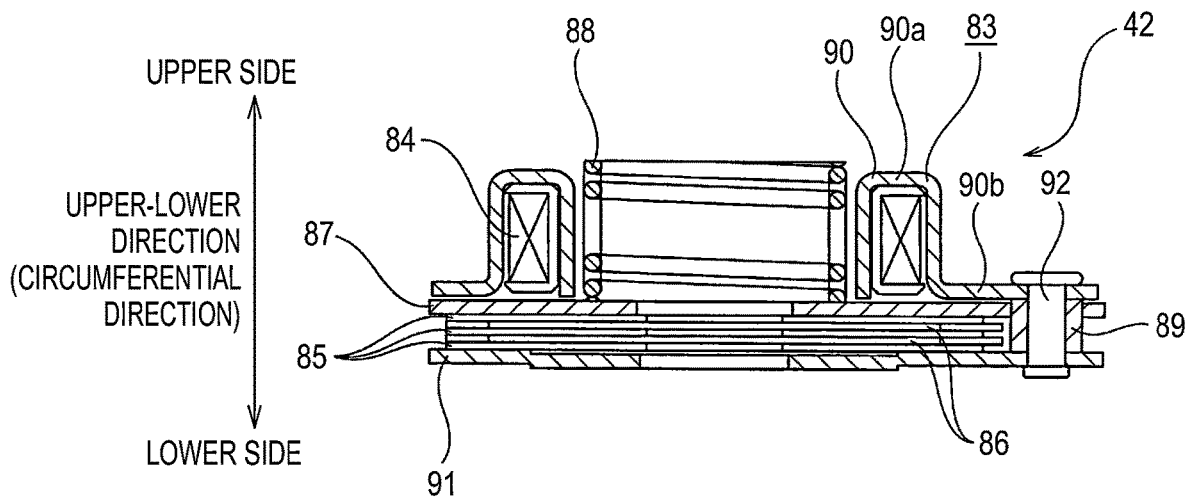
FIG. 22 is a cross-sectional view taken along a line D-D in FIG. 20.

The gear accommodating portion 49 only communicates with the motor accommodating portion 48, and does not communicate with the brake accommodating portion 50. In the present example, a first partition wall 51 that partitions the motor accommodating portion 48 and the gear accommodating portion 49 is provided between the motor accommodating portion 48 and the gear accommodating portion 49, so that a communication position and a communication range between the motor accommodating portion 48 and the gear accommodating portion 49 are limited. Specifically, as shown in FIG. 17, the motor accommodating portion 48 and the gear accommodating portion 49 communicate with each other only by a first communication hole 52 formed in the first partition wall 51 through which a first connection portion 60 of a motor shaft 58 (described later) that constitutes the electric motor 40 can be inserted. The first partition wall 51 is provided integrally with the housing main body 45.

Figure 12:
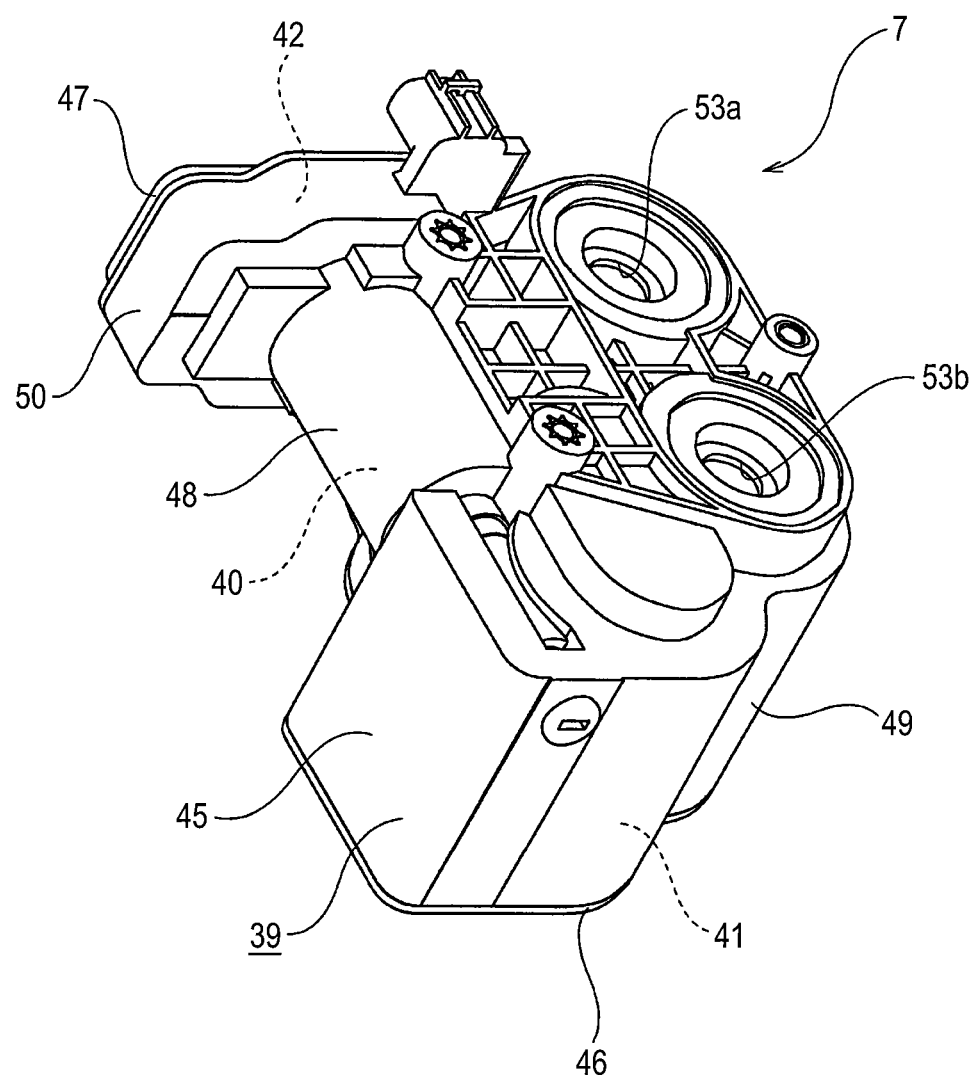
FIG. 12 is a perspective view showing the motor gear unit according to the first example of the embodiment.
Figure 13:
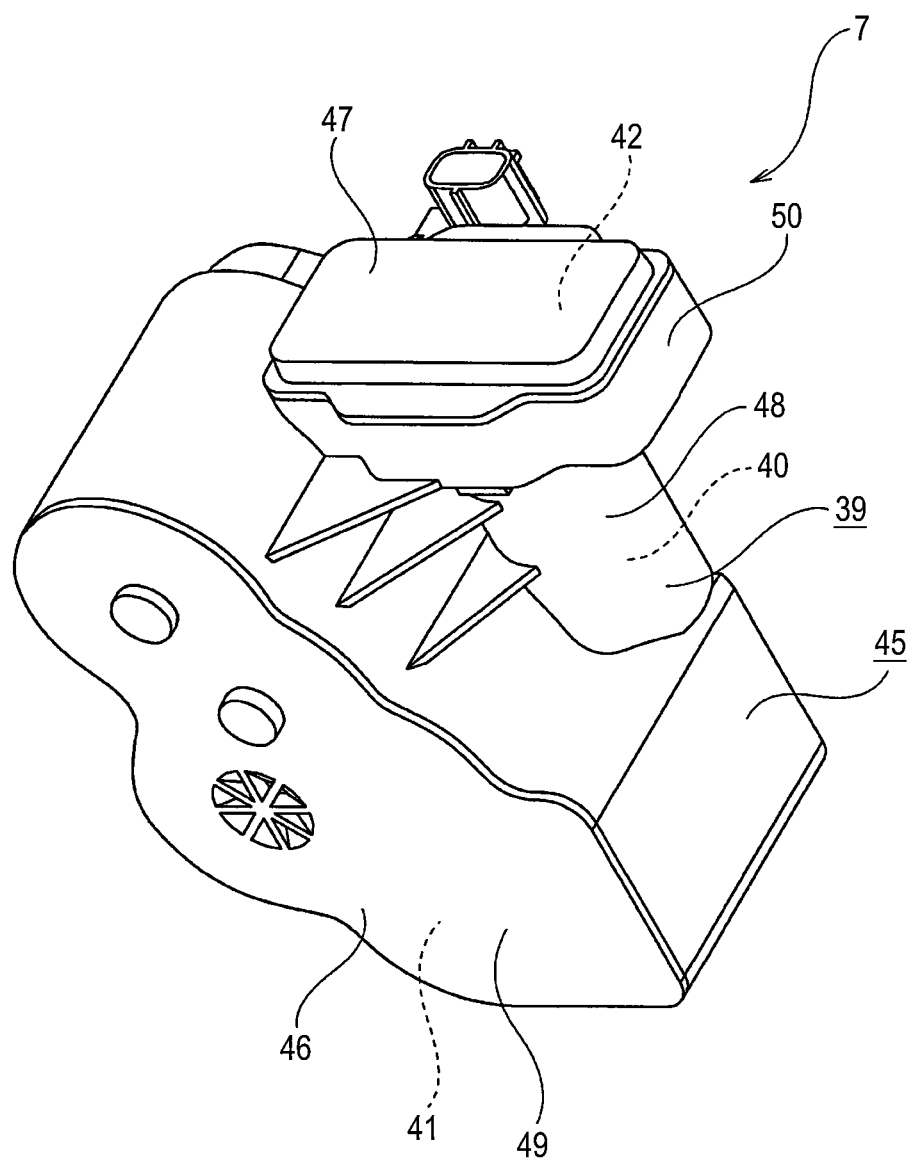
FIG. 13 is a perspective view of the motor gear unit according to the first example of the embodiment when viewed from an angle different from that of FIG. 12.
Figure 14:
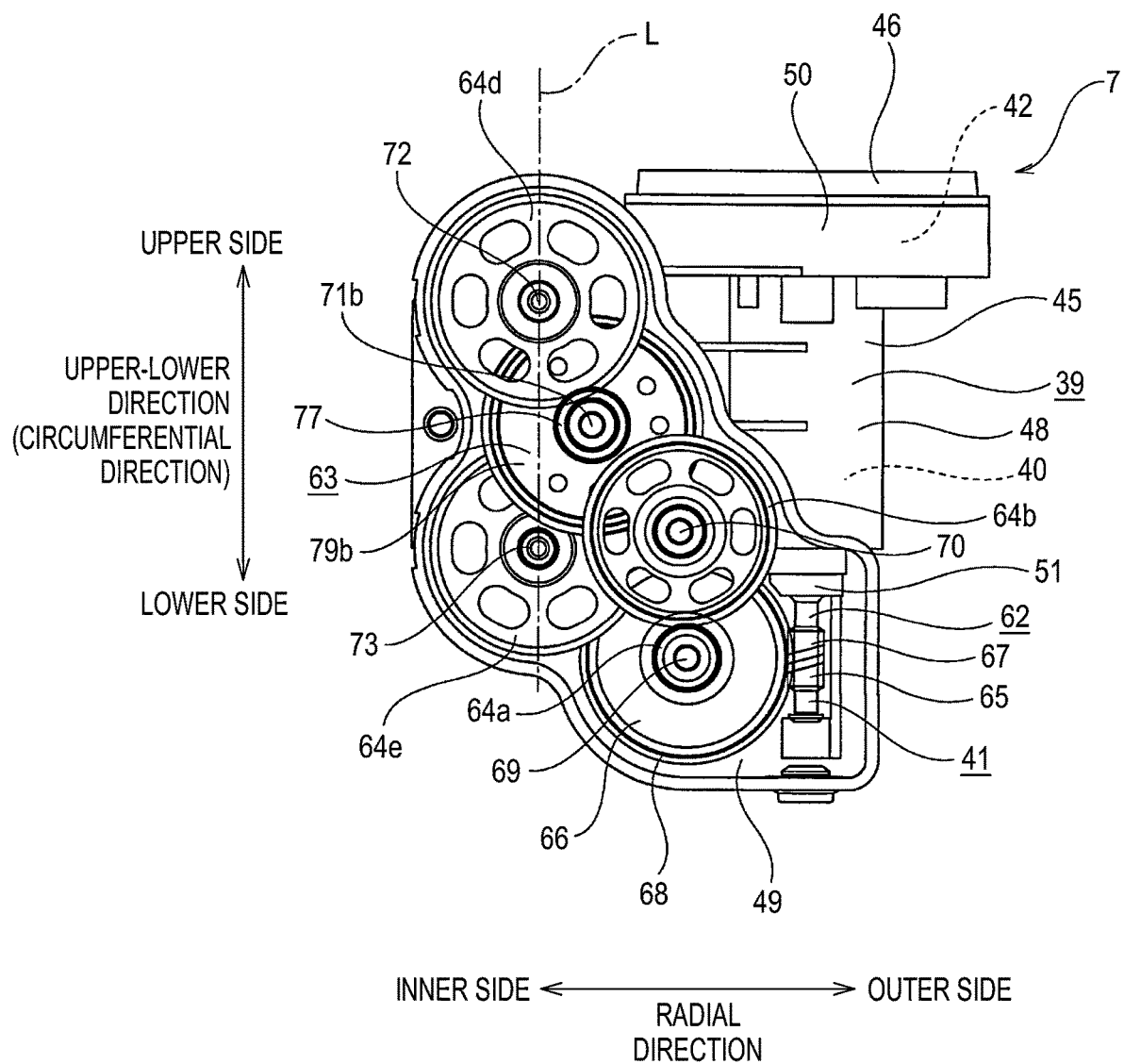
FIG. 14 is a rear view showing the motor gear unit according to the first example of the embodiment with a closing plate portion removed from a state shown in FIG. 9.
Figure 15:
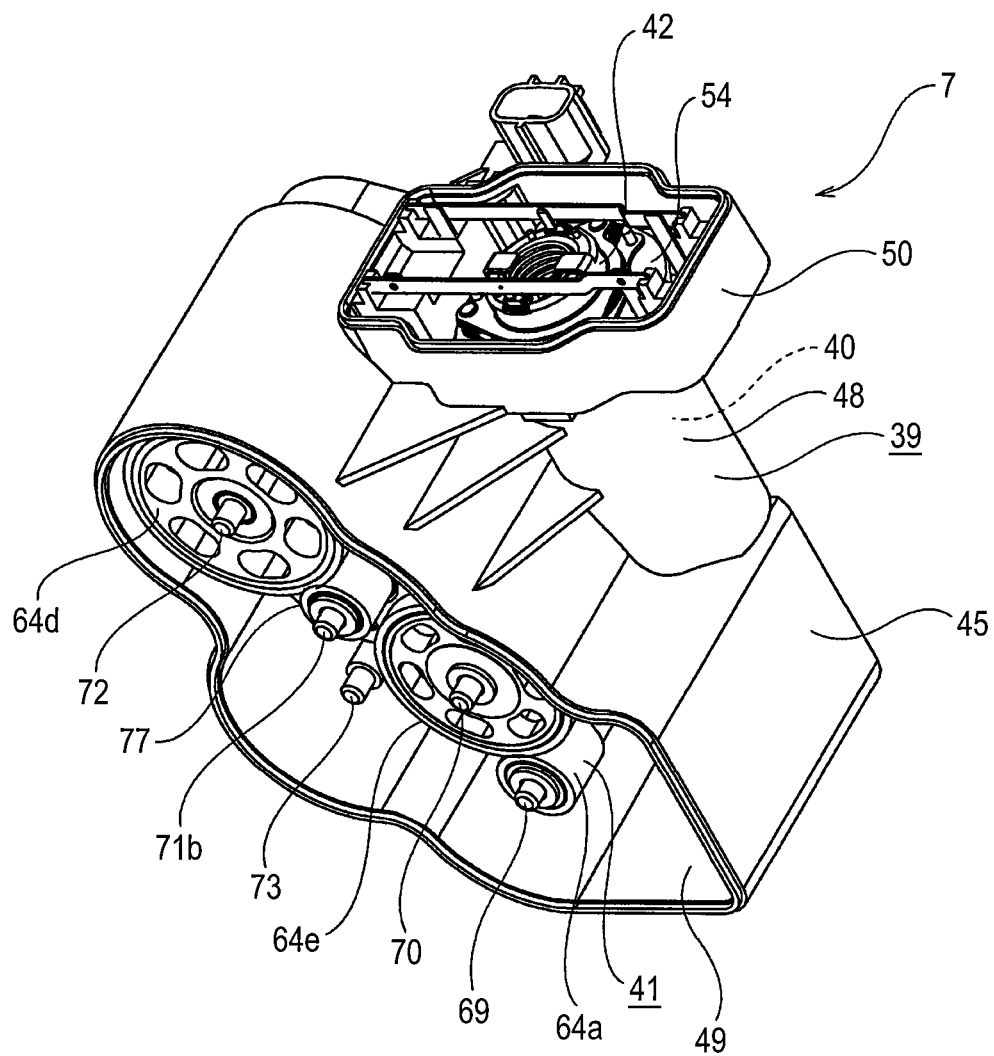
FIG. 15 is a perspective view showing the motor gear unit according to the first example of the embodiment with the closing plate portion and a lid body removed from a state shown in FIG. 13.
Figure 16:
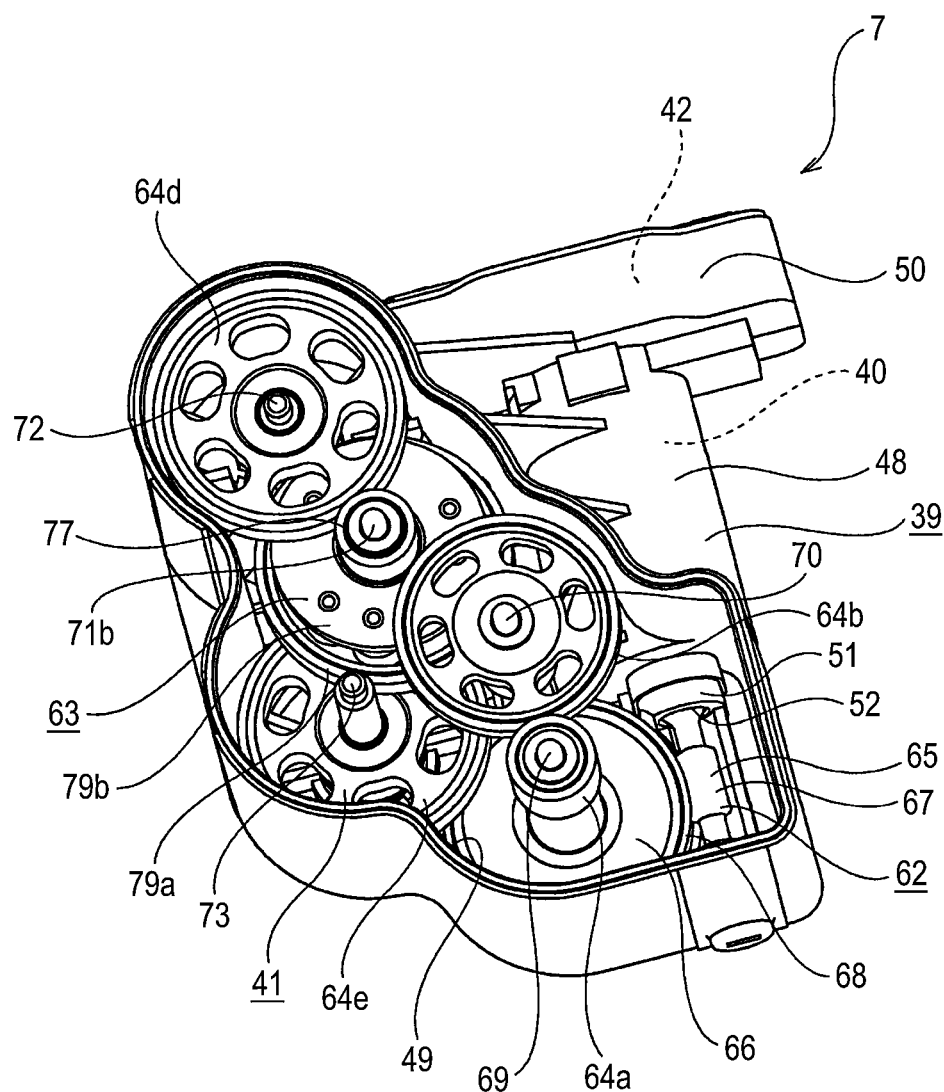
FIG. 16 is a perspective view of the motor gear unit according to the first example of the embodiment when viewed from an angle different from that of FIG. 15 in a state where the closing plate portion and the lid body are removed.

As shown in FIG. 12, two insertion holes 53a and 53b into which base end portions of the spindles 29a and 29b can be inserted are opened in an axially inner surface of the gear accommodating portion 49. Central axes of the insertion holes 53a and 53b are arranged toward the axial direction. An opening portion of the gear accommodating portion 49 on an axially outer side is closed by the closing plate portion 46.

The brake accommodating portion 50 is a portion that accommodates the non-excited operation type brake 42 therein. In the shown example, the brake accommodating portion 50 is formed in a rectangular housing shape.

The brake accommodating portion 50 only communicates with the motor accommodating portion 48. In the present example, as shown in FIG. 17, a second partition wall 54 that partitions the motor accommodating portion 48 and the gear accommodating portion 49 is provided between the motor accommodating portion 48 and the brake accommodating portion 50, so that a communication position and a communication range between the motor accommodating portion 48 and the brake accommodating portion 50 are limited. Specifically, the motor accommodating portion 48 and the brake accommodating portion 50 communicate with each other by a second communication hole 55 formed in the second partition wall 54 through which a second connection portion 61 of the motor shaft 58 (described later) that constitutes the electric motor 40 can be inserted. In the present example, the second partition wall 54 is configured separately from the housing main body 45, and is attached to the housing main body 45. The second partition wall 54 is formed with a small through hole 56 that functions as a clearance between the electric motor 40 and a motor electrode portion, but the small through hole 56 is substantially closed by a fixing plate 91 (described later) disposed by overlapping the second partition wall 54.

An opening portion of the brake accommodating portion 50 on an upper side is closed by the lid body 47.

As shown in FIGS. 1 and 2, in a state where the disc brake apparatus 1 is attached to the suspension device, the brake accommodating portion 50 is disposed above the motor accommodating portion 48. Therefore, the non-excited operation type brake 42 disposed inside the brake accommodating portion 50 is disposed above the electric motor 40 disposed inside the motor accommodating portion 48.

Electric Motor

Figure 23:
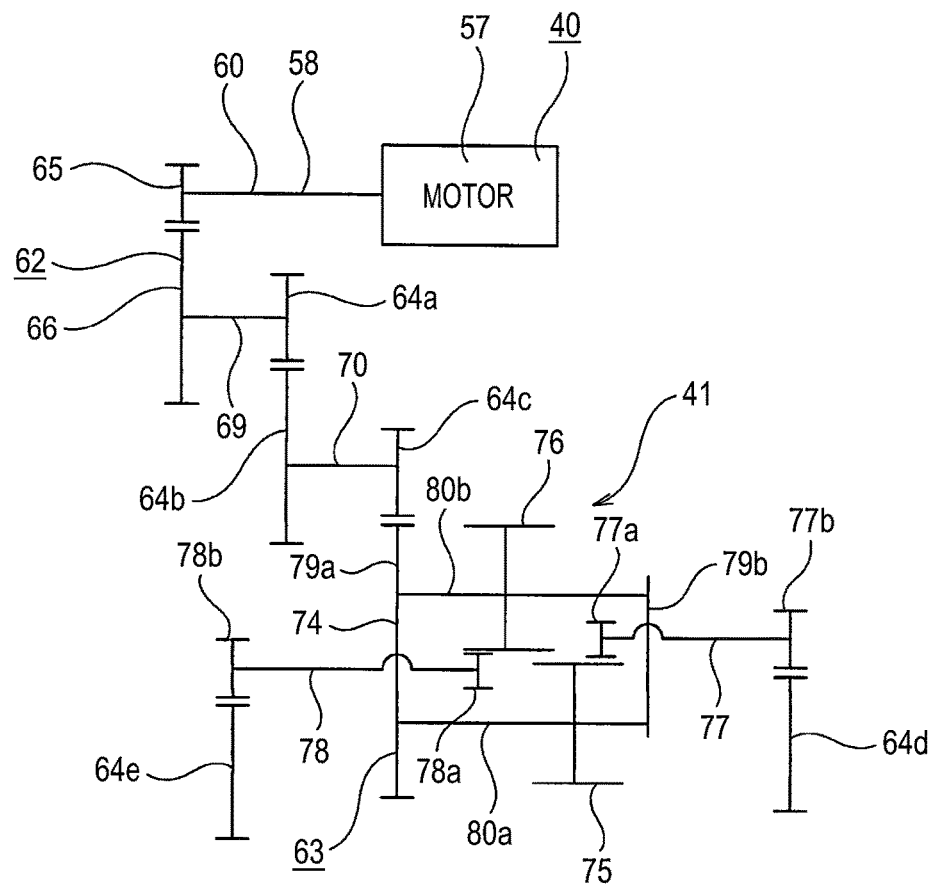
FIG. 23 is a schematic diagram showing the speed reduction mechanism according to the first example of the embodiment.

The electric motor 40 is disposed inside the motor accommodating portion 48. The electric motor 40 includes the motor main body 57 and the motor shaft 58. In FIG. 23, these components (the motor main body 57 and the motor shaft 58) are schematically shown.

The motor main body 57 includes a motor housing 59 having a cylindrical shape, and a rotor and a stator (not shown) arranged inside the motor housing 59. The rotor is supported by an axially intermediate portion of the motor shaft 58. The stator is disposed around the rotor and supported inside the motor housing 59.

In a state where the electric motor 40 is disposed inside the motor accommodating portion 48, the motor shaft 58 is disposed coaxially with the central axis of the motor accommodating portion 48. In a state where the disc brake apparatus 1 is attached to the suspension device, the motor shaft 58 is disposed toward the upper-lower direction.

End portions of the motor shaft 58 on axially both sides protrude from the motor main body 57 to the axially both sides. The motor shaft 58 includes the shaft-shaped first connection portion 60 connected to the speed reduction mechanism 41 at an end portion on axially one side that protrudes from the motor main body 57. Further, the motor shaft 58 includes the shaft-shaped second connection portion 61 connected to the non-excited operation type brake 42 at an end portion on axially the other side that protrudes from the motor main body 57. Since the motor shaft 58 is disposed toward the upper-lower direction, the first connection portion 60 is disposed on a lower side in the upper-lower direction, and the second connection portion 61 is disposed on an upper side in the upper-lower direction.

The electric motor 40 rotates the motor shaft 58 in a predetermined direction by a predetermined angle based on a command signal from a control device (not shown).

Speed Reduction Mechanism

The speed reduction mechanism 41 increases a torque (power) of the electric motor 40, and transmits the increased torque (power) to the first rotary-to-linear motion conversion mechanism 6a and the second rotary-to-linear motion conversion mechanism 6b. Therefore, the speed reduction mechanism 41 transmits rotation of the electric motor 40 to the two spindles 29a and 29b. The speed reduction mechanism 41 is accommodated inside the gear accommodating portion 49.

The speed reduction mechanism 41 includes a worm speed reduction mechanism 62, a power distribution mechanism (differential) 63, and a plurality of gears (spur gears) 64a to 64e. In FIG. 23, some of these components (the worm speed reduction mechanism 62, the power distribution mechanism 63, and the plurality of gears 64a to 64e) are schematically shown.

The worm speed reduction mechanism 62 is connected to the first connection portion 60 of the motor shaft 58 of the electric motor 40. The worm speed reduction mechanism 62 includes a worm 65 and a worm wheel 66, and does not have a self-lock function. Therefore, the worm speed reduction mechanism 62 of the present example can not only transmit rotation of the electric motor 40 to the first rotary-to-linear motion conversion mechanism 6a and the second rotary-to-linear motion conversion mechanism 6b, but also transmit rotation reversely input from the first rotary-to-linear motion conversion mechanism 6a and the second rotary-to-linear motion conversion mechanism 6b to the motor shaft 58 of the electric motor 40.

The worm 65 includes worm teeth 67 at an axially intermediate portion of an outer peripheral surface thereof, and is disposed coaxially with the motor shaft 58 of the electric motor 40. An end portion (base end portion) of the worm 65 on axially the other side is fixed to the first connection portion 60 of the motor shaft 58 so as not to be relatively rotatable. An end portion of the worm 65 on axially one side is rotatably supported inside the gear accommodating portion 49 via a bearing (not shown).

The worm wheel 66 includes wheel teeth 68 on an outer peripheral surface thereof. The wheel teeth 68 mesh with the worm teeth 67 provided on the worm 65. The worm wheel 66 is fitted onto and fixed to a first intermediate shaft 69 rotatably supported inside the gear accommodating portion 49 so as not to be relatively rotatable. The first intermediate shaft 69 is disposed substantially parallel to central axes of the spindle 29a of the first rotary-to-linear motion conversion mechanism 6a and the spindle 29b of the second rotary-to-linear motion conversion mechanism 6b. Therefore, a rotation central axis of the worm wheel 66 is disposed substantially parallel to the central axes of the spindles 29a and 29b. The term "substantially parallel" means not only completely parallel but also substantially parallel.

In addition to the first intermediate shaft 69, a second intermediate shaft 70, a pair of support shafts 71a and 71b, the first output shaft 72, and the second output shaft 73 are supported inside the gear accommodating portion 49. The second intermediate shaft 70, the pair of support shafts 71a and 71b, the first output shaft 72, and the second output shaft 73 are arranged substantially parallel to the first intermediate shaft 69. The first intermediate shaft 69, the second intermediate shaft 70, the pair of support shafts 71a and 71b, the first output shaft 72, and the second output shaft 73 constitute the speed reduction mechanism 41.

The first gear 64a is fitted onto and fixed to the first intermediate shaft 69 at a portion axially deviated from the worm wheel 66 so as not to be relatively rotatable. The first gear 64a has a smaller number of teeth than the wheel teeth 68, and meshes with the second gear 64b fitted onto and fixed to the second intermediate shaft 70 so as not to be relatively rotatable. The third gear 64c having a smaller number of teeth than the second gear 64b is fitted onto and fixed to the second intermediate shaft 70 at a portion axially deviated from the second gear 64b so as not to be relatively rotatable. The third gear 64c meshes with an input member 74 that constitutes the power distribution mechanism 63. Therefore, the power distribution mechanism 63 is located downstream of the worm speed reduction mechanism 62 in a power transmission direction of the electric motor 40.

The power distribution mechanism 63 has a function of distributing and transmitting power input to the input member 74 to the fourth gear 64d that is a final gear and that is fixed to the first output shaft 72 so as not to be relatively rotatable, and the fifth gear 64e that is a final gear and that is fixed to the second output shaft 73 so as not to be relatively rotatable. Specifically, power corresponding to magnitude (easiness of rotation) of a rotational load of the spindles 29a and 29b is distributed to the fourth gear 64d and the fifth gear 64e. Accordingly, regardless of a difference in efficiency between the first rotary-to-linear motion conversion mechanism 6a and the second rotary-to-linear motion conversion mechanism 6b and the like, a difference is prevented from occurring between a force by which the first piston 5a presses the inner pad 4b by the first rotary-to-linear motion conversion mechanism 6a and a force by which the second piston 5b presses the inner pad 4b by the second rotary-to-linear motion conversion mechanism 6b.

The power distribution mechanism 63 includes the pair of support shafts 71a and 71b, the input member (carrier) 74, a first intermediate gear 75, a second intermediate gear 76, a first output member 77, and a second output member 78. The input member 74, the first output member 77, and the second output member 78 are also gears including teeth portions on their outer peripheral surfaces.

The pair of support shafts 71a and 71b are coaxially arranged, and are non-rotatably supported inside the gear accommodating portion 49. The support shafts 71a and 71b are arranged at a center of the power distribution mechanism 63.

The input member 74 includes a pair of support rings 79a and 79b each having an annular shape, and a plurality of pins 80a and 80b bridged between the pair of support rings 79a and 79b. One support ring 79a includes a teeth portion that meshes with the third gear 64c on an outer peripheral surface thereof, and the second output member 78 is inserted through an inside of the support ring 79a. The first output member 77 is inserted through an inside of the other support ring 79b. The pins 80a and 80b are arranged parallel to the support shafts 71a and 71b.

The first intermediate gear 75 and the second intermediate gear 76 are rotatably supported with respect to the input member 74. Specifically, the first intermediate gear 75 and the second intermediate gear 76 are rotatably supported around the pins 80a and 80b, and are arranged at a portion between the pair of support rings 79a and 79b. The first intermediate gear 75 and the second intermediate gear 76 mesh with each other.

The first output member 77 is formed in a hollow tubular shape, and is rotatably supported around the support shaft 71b. The first output member 77 includes an input teeth portion 77a and an output teeth portion 77b. The input teeth portion 77a meshes with the first intermediate gear 75. On the contrary, the output teeth portion 77b meshes with the fourth gear 64d that is a final gear and that is fitted onto and fixed to the first output shaft 72 so as not to be relatively rotatable.

The second output member 78 is formed in a hollow tubular shape, and is rotatably supported around the support shaft 71a. The second output member 78 includes an input teeth portion 78a and an output teeth portion 78b. The input teeth portion 78a meshes with the second intermediate gear 76. On the contrary, the output teeth portion 78b meshes with the fifth gear 64e that is a final gear and that is fitted onto and fixed to the second output shaft 73 so as not to be relatively rotatable.

Therefore, rotation of the first output member 77 is transmitted to the first output shaft 72 through a meshing portion between the output teeth portion 77b and the fourth gear 64d that is the final gear. Further, rotation of the second output member 78 is transmitted to the second output shaft 73 through a meshing portion between the output teeth portion 78b and the fifth gear 64e that is the final gear.

The first output shaft 72 and the second output shaft 73 are arranged substantially parallel to the central axes of the spindles 29a and 29b. Therefore, rotation central axes of the fourth gear 64d and the fifth gear 64e, which are the final gears, are arranged substantially parallel to the central axes of the spindles 29a and 29b. Further, an imaginary line L (see FIG. 14) orthogonal to the rotation central axes of the fourth gear 64d and the fifth gear 64e that are the final gears and the motor shaft 58 that constitutes the electric motor 40 are arranged substantially parallel to each other.

Engagement holes (serration holes) 81a and 81b are provided in end portions of the first output shaft 72 and the second output shaft 73 on an axially outer side. In the present example, end portions (base end portions) of the spindles 29a and 29b on an axially inner side are engaged with the engagement holes 81a and 81b so as not to be relatively rotatable. Accordingly, the first output shaft 72 and the spindle 29a are coaxially connected so as not to be relatively rotatable. Further, the second output shaft 73 and the spindle 29b are coaxially connected so as not to be relatively rotatable.

When the power distribution mechanism 63 operates, the input member 74 rotates (rotates on its own axis) around the support shaft 71a, so that the first intermediate gear 75 and the second intermediate gear 76 revolve.

Then, when magnitudes of rotational loads of the first output member 77 and the second output member 78, that is, magnitudes (easiness of rotation) of rotational loads of the spindles 29a and 29b are the same as each other, the first intermediate gear 75 and the second intermediate gear 76 only revolve without rotating on their own axes and transmit power to the first output member 77 and the second output member 78 in a state where the first intermediate gear 75 and the second intermediate gear 76 are meshed with each other. Therefore, both the first output member 77 meshed with the first intermediate gear 75 and the second output member 78 meshed with the second intermediate gear 76 are rotated in the same direction at the same speed. A case where the magnitudes of the rotational loads of the spindles 29a and 29b are the same as each other refers to a state where the spindles 29a and 29b rotate with no load while tip end portions of the nuts 30a and 30b do not press the first piston 5a and the second piston 5b.

On the contrary, when the magnitudes of the rotational loads of the first output member 77 and the second output member 78, that is, the magnitudes of the rotational loads of the spindles 29a and 29b are different from each other, the first intermediate gear 75 and the second intermediate gear 76 do not only revolve but also rotate on their own axes and transmit power to one of or both of the first output member 77 and the second output member 78 in a state where the first intermediate gear 75 and the second intermediate gear 76 are meshed with each other. A case where the magnitudes of the rotational loads of the spindles 29a and 29b are different from each other occurs when the first piston 5a and the second piston 5b do not simultaneously press the inner pad 4b, and a timing at which the first piston 5a and the second piston 5b press the inner pad 4b is shifted due to a difference in efficiency between the first rotary-to-linear motion conversion mechanism 6a and the second rotary-to-linear motion conversion mechanism 6b or the like.

For example, when the first piston 5a presses the inner pad 4b prior to the second piston 5b, a rotational load of the spindle 29a that constitutes the first rotary-to-linear motion conversion mechanism 6a is larger than a rotational load of the spindle 29b that constitutes the second rotary-to-linear motion conversion mechanism 6b. In this case, the power distribution mechanism 63 distributes and transmits rotation of the input member 74 to the first output member 77 and the second output member 78 such that a rotation speed of the first output member 77 is lower than a rotation speed of the second output member 78. Conversely, when the second piston 5b presses the inner pad 4b prior to the first piston 5a, the rotational load of the spindle 29a that constitutes the first rotary-to-linear motion conversion mechanism 6a is smaller than the rotational load of the spindle 29b that constitutes the second rotary-to-linear motion conversion mechanism 6b. In this case, the power distribution mechanism 63 distributes and transmits the rotation of the input member 74 to the first output member 77 and the second output member 78 such that the rotation speed of the first output member 77 is higher than the rotation speed of the second output member 78.

Lubricant such as grease is applied to the speed reduction mechanism 41 as described above in order to ensure smooth operation. Therefore, the gear accommodating portion 49 that accommodates the speed reduction mechanism 41 is filled with the lubricant.

In the present example, the fourth gear 64d that is the final gear is connected to the spindle 29a via the first output shaft 72, and the fifth gear 64e that is the final gear is connected to the spindle 29b via the second output shaft 73. However, when the present invention is carried out, the first output shaft and the spindle and/or the second output shaft and the spindle may be integrally formed, and the final gear may be directly connected to the spindle.

Non-Excited Operation Type Brake

As shown in FIG. 17, the non-excited operation type brake 42 is connected to the second connection portion 61 of the motor shaft 58 that constitutes the electric motor 40. Specifically, the non-excited operation type brake 42 is connected to the second connection portion 61 via a connection shaft 82. The connection shaft 82 is connected to the second connection portion 61 so as not to be relatively rotatable. The non-excited operation type brake 42 is a friction brake, and has a function of allowing rotation of the motor shaft 58 during energization and preventing the rotation of the motor shaft 58 during non-energization.

In the disc brake apparatus 1 of the present example, the non-excited operation type brake 42 is disposed inside the brake accommodating portion 50 located above the motor accommodating portion 48 that accommodates the electric motor 40 in the housing 39. Therefore, the non-excited operation type brake 42 is disposed above the electric motor 40.

The non-excited operation type brake 42 includes a casing 83, an electromagnetic coil 84, a plurality of (three in the shown example) rotation-side discs 85, a plurality of (two in the shown example) stationary-side discs 86, a pressing plate (armature) 87, a pressing spring 88, and a plurality of (three in the shown example) spacers 89.

The casing 83 includes a casing main body 90, a fixing plate 91, and a plurality of (three in the shown example) rivets 92.

The casing main body 90 is made of a magnetic metal and is formed in an annular shape as a whole. The casing main body includes a coil accommodating portion 90a having a substantially U-shaped cross section, and an outward flange portion 90b provided on a radially outer side of the coil accommodating portion 90a. The fixing plate 91 is made of a metal and is formed in a hollow triangular shape as a whole. The fixing plate 91 is fixed to an upper surface of the second partition wall 54. The rivets 92 couple the casing main body 90 and the fixing plate 91 in a state of being separated from each other. The rivets 92 are arranged between the outward flange portion 90b of the casing main body 90 and a radially outer portion of the fixing plate 91.

The electromagnetic coil 84 is formed in an annular shape, and is disposed inside the coil accommodating portion 90a of the casing main body 90.

The rotation-side discs 85 and the stationary-side discs 86 are each formed in a circular ring shape, and are alternately arranged in an axial direction of the motor shaft 58 of the electric motor 40.

The rotation-side discs 85 are engaged with the connection shaft 82 fixed to the second connection portion 61 of the motor shaft 58 so as to be relatively displaceable in the axial direction of the motor shaft 58 and so as not to be relatively displaceable in a circumferential direction of the motor shaft 58. For this purpose, in the present example, a female spline 85a provided on an inner peripheral edge portion of the rotation-side disc 85 is spline-engaged with a male spline 82a provided on an outer peripheral surface of the connection shaft 82. Accordingly, the rotation-side disc 85 can be rotated in synchronization with the motor shaft 58.

On the contrary, the stationary-side disc 86 is supported by the casing 83 so as to be relatively displaceable in the axial direction of the motor shaft 58 and so as not to be relatively displaceable in the circumferential direction of the motor shaft 58. For this purpose, a bifurcated engagement protrusion portion 86a provided on an outer peripheral edge portion of the stationary-side disc 86 is engaged with the rivet 92. Accordingly, the stationary-side disc 86 is prevented from rotating even during use.

The pressing plate 87 is made of a magnetic metal, and is formed in an annular shape as a whole. The pressing plate 87 is disposed between the electromagnetic coil 84 and a disc (the rotation-side disc 85 in the shown example) disposed closest to an electromagnetic coil 84 side among the rotation-side discs 85 and the stationary-side discs 86. Similar to the stationary-side disc 86, the pressing plate 87 is supported by the casing 83 so as to be relatively displaceable in the axial direction of the motor shaft 58 and so as not to be relatively displaceable in the circumferential direction of the motor shaft 58. For this purpose, the rivet 92 is inserted through an engagement hole 87a provided in the outer peripheral edge portion of the pressing plate 87.

The pressing spring 88 is disposed between the pressing plate 87 and claw portions 90c provided on the casing main body 90 in an elastically deformed state. The pressing spring 88 elastically presses the pressing plate 87 in a direction approaching the fixing plate 91.

The spacer 89 is disposed around each rivet 92. The spacer 89 is engaged with the stationary-side disc 86 and the pressing plate 87 to prevent rotations of the stationary-side disc 86 and the pressing plate 87.

In the non-excited operation type brake 42 of the present example, when the electromagnetic coil 84 is energized, a magnetic circuit is formed in the casing main body 90 and the pressing plate 87 arranged around the electromagnetic coil 84. Accordingly, the pressing plate 87 is attracted to the casing main body 90 and elastically compresses and deforms the pressing spring 88. Therefore, the rotation-side disc 85 and the stationary-side disc 86 are not strongly pressed against each other by the pressing plate 87. Therefore, rotation of the motor shaft 58 is allowed.

On the contrary, during a non-energization period during which energization to the electromagnetic coil 84 is stopped, the magnetic circuit formed during energization is not formed in the casing main body 90 and the pressing plate 87. Therefore, the rotation-side discs 85 and the stationary-side discs 86 are strongly pressed against the fixing plate 91 by the pressing spring 88 via the pressing plate 87. Accordingly, the rotation-side disc 85 and the stationary-side disc 86 are strongly pressed against each other and frictionally engaged with each other. As a result, the rotation of the motor shaft 58 is prevented.

Description of Operation of Disc Brake Apparatus

When the service brake is operated by the disc brake apparatus 1 of the present example, the brake oil is fed to the first cylinder 20a and the second cylinder 20b provided in the caliper 3 through an oil passage (not shown). Accordingly, the first piston 5a and the second piston 5b are pushed out from the first cylinder 20a and the second cylinder 20b, and the inner pad 4b is pressed against an axially inner surface of the rotor 8. Further, the caliper 3 is displaced axially inward with respect to the support 2 by a reaction force caused by the pressing. Then, the outer pad 4a is pressed against an axially outer surface of the rotor 8 by the pressing portion 15 of the caliper 3. Accordingly, a braking force is obtained by friction that acts on contact surfaces between the pair of pads 4a and 4b and the rotor 8. In this way, the disc brake apparatus 1 obtains the braking force by the service brake by pushing out the first piston 5a and the second piston 5b by introducing the brake oil.

When the parking brake is operated by the disc brake apparatus 1, the electric motor 40 that constitutes the motor gear unit 7 is energized, and the spindle 29a that constitutes the first rotary-to-linear motion conversion mechanism 6a and the spindle 29b that constitutes the second rotary-to-linear motion conversion mechanism 6b are rotationally driven in the forward rotation direction via the speed reduction mechanism 41. Accordingly, the nuts 30a and 30b are moved axially outward. Then, since the first piston 5a and the second piston 5b are pushed out toward the rotor 8, the inner pad 4b is pressed against the axially inner surface of the rotor 8. Further, the caliper 3 is displaced axially inward with respect to the support 2 by the reaction force caused by the pressing. Then, the outer pad 4a is pressed against the axially outer surface of the rotor 8 by the pressing portion 15 of the caliper 3. Accordingly, the braking force is obtained by the friction that acts on the contact surfaces between the pair of pads 4a and 4b and the rotor 8. In this way, the disc brake apparatus 1 obtains the braking force by the parking brake by pushing out the first piston 5a and the second piston 5b by using the motor gear unit 7.

During a non-energization period during which an engine of an automobile is stopped and energization to the electric motor 40 is stopped, energization to the electromagnetic coil 84 that constitutes the non-excited operation type brake 42 is also stopped. Therefore, the rotation of the motor shaft 58 can be prevented by the non-excited operation type brake 42. Therefore, the disc brake apparatus 1 of the present example can maintain the braking force by the parking brake even in a state where energization to the electric motor 40 is stopped.

According to the disc brake apparatus 1 of the present example as described above, it is possible to prevent the lubricant from adhering to the non-excited operation type brake 42.

That is, in the disc brake apparatus 1 of the present example, the speed reduction mechanism 41 is connected to the first connection portion 60 provided on the end portion on axially one side of the motor shaft 58 that constitutes the electric motor 40, and the non-excited operation type brake 42 is connected to the second connection portion 61 provided on the end portion on axially the other side of the motor shaft 58 that constitutes the electric motor 40. Therefore, the non-excited operation type brake 42 can be disposed on a side opposite to the speed reduction mechanism 41 in the axial direction of the motor shaft 58. That is, the non-excited operation type brake 42 can be disposed at a position far from the speed reduction mechanism 41 to which the lubricant is applied. Therefore, the lubricant applied to the speed reduction mechanism 41 can be prevented from adhering to the non-excited operation type brake 42.

In a state where the disc brake apparatus 1 is attached to the suspension device that constitutes the vehicle body, the motor shaft 58 of the electric motor 40 is disposed toward the upper-lower direction, and the non-excited operation type brake 42 is disposed above the electric motor 40. Therefore, in the present example, it is also possible to prevent the lubricant from adhering to the non-excited operation type brake 42 due to an action of gravity. Therefore, according to the disc brake apparatus 1 of the present example, since the lubricant can be effectively prevented from adhering to the non-excited operation type brake 42, even in a state where energization to the electric motor 40 is stopped, the braking force by the parking brake can be sufficiently maintained.

In the housing 39, the gear accommodating portion 49 that accommodates the speed reduction mechanism 41 and the motor accommodating portion 48 that accommodates the electric motor 40 are partitioned by the first partition wall 51, and the motor accommodating portion 48 and the gear accommodating portion 49 communicate with each other only by the first communication hole 52 through which the first connection portion 60 of the motor shaft 58 can be inserted. Therefore, the lubricant applied to the speed reduction mechanism 41 can be effectively prevented from moving to an inside of the motor accommodating portion 48.

Further, in the present example, in the housing 39, the motor accommodating portion 48 that accommodates the electric motor 40 and the brake accommodating portion 50 that accommodates the non-excited operation type brake 42 are partitioned by the second partition wall 54, and the motor accommodating portion 48 and the brake accommodating portion 50 communicate with each other by the second communication hole 55 through which the second connection portion 61 of the motor shaft 58 can be inserted. Therefore, even when the lubricant reaches the inside of the motor accommodating portion 48, the lubricant can be effectively prevented from moving from the inside of the motor accommodating portion 48 to an inside of the brake accommodating portion 50. Therefore, the lubricant can be effectively prevented from adhering to the non-excited operation type brake 42.

Further, according to the present example, since the motor gear unit 7 is unitized by including the non-excited operation type brake 42, the motor gear unit 7 that is compact and has high assemblability can be implemented.

In the present example, the worm speed reduction mechanism 62 that does not have the self-lock function is used instead of including the non-excited operation type brake 42. Therefore, as compared with a case where a worm speed reduction mechanism having the self-lock function is used, frictional resistance (energy loss) can be prevented, and input/output characteristics can be improved.

Rotation central axes of all the gears other than the worm 65 accommodated in the gear accommodating portion 49, that is, the worm wheel 66, the gears 64a to 64e, the input member 74, the first intermediate gear 75, the second intermediate gear 76, the first output member 77, and the second output member 78 are arranged substantially parallel to the central axes of the spindles 29a and 29b. Therefore, workability of work of incorporating the speed reduction mechanism 41 inside the gear accommodating portion 49 can be improved.

Since the imaginary line L (see FIG. 14) orthogonal to the rotation central axes of the fourth gear 64d and the fifth gear 64e that are the final gears and the motor shaft 58 that constitutes the electric motor 40 are arranged substantially parallel to each other, a width dimension (a left-right dimension in FIG. 14) in a radial direction of the motor gear unit 7 can be suppressed to be small.

Since the speed reduction mechanism 41 includes the power distribution mechanism 63, a pressing force on the inner pad 4b by the first piston 5a and a pressing force on the inner pad 4b by the second piston 5b can be made uniform.

Since rotation of the electric motor 40 is transmitted to the power distribution mechanism 63 via the worm speed reduction mechanism 62, as compared with a case where a structure in which the rotation is transmitted to a pair of worm speed reduction mechanisms from a power distribution mechanism is adopted, a difference between a torque transmitted to the spindle 29a that constitutes the first rotary-to-linear motion conversion mechanism 6a and a torque transmitted to the spindle 29b that constitutes the second rotary-to-linear motion conversion mechanism 6b can be reduced.

Although the embodiment of the present invention has been described above, the present invention is not limited thereto, and can be appropriately changed without departing from the technical idea of the invention.

The present invention is not limited to the embodiment, and for example, the non-excited operation type brake, the power distribution mechanism, and the like can be appropriately changed to structures known in the related art. Further, the motor gear unit for the disc brake apparatus of the present invention is not limited to the floating type disc brake apparatus, and can also be applied to an opposing piston type disc brake apparatus. Further, the disc brake apparatus of the present invention may also include three or more cylinders, three or more pistons, and three or more rotary-to-linear motion conversion mechanisms.

What is claimed is:

1. A motor gear unit for a disc brake apparatus, comprising:
   a housing;
   an electric motor;
   a speed reduction mechanism; and
   a non-excited operation type brake, wherein
   the housing includes a motor accommodating portion, a gear accommodating portion, and a brake accommodating portion, and is supported by and fixed to a caliper of the disc brake apparatus,
   the electric motor includes a motor shaft which includes a first connection portion connected to the speed reduction mechanism on an axially one side portion and a second connection portion connected to the non-excited operation type brake on an axially another side portion, and is disposed inside the motor accommodating portion,
   the speed reduction mechanism is connected to the first connection portion, transmits a rotation of the electric motor to a rotary-to-linear motion conversion mechanism disposed in a cylinder of the caliper, and is disposed inside the gear accommodating portion,
   the non-excited operation type brake is connected to the second connection portion, prevents a rotation of the motor shaft during a non-energization period, and is disposed inside the brake accommodating portion,
   in a state where the disc brake apparatus is attached to a vehicle body, the motor shaft is disposed so as to be orientated in an upper-lower direction, and the non-excited operation type brake is disposed above the electric motor,
   the speed reduction mechanism includes a worm connected to the first connection portion, a worm wheel meshed with the worm, and a plurality of gears, and
   a rotation central axis of the worm wheel and rotation central axes of the plurality of gears are disposed substantially parallel to a central axis of the rotary-to-linear motion conversion mechanism.

2. The motor gear unit for the disc brake apparatus according to claim 1, wherein
   the housing further includes a first partition wall partitioning the motor accommodating portion and the gear accommodating portion.

3. A disc brake apparatus comprising:
   a caliper including a cylinder on an axially inner side of a rotor;
   a piston fitted into the cylinder;
   a rotary-to-linear motion conversion mechanism, disposed in the cylinder, and configured to push out the piston toward the rotor by converting a rotary motion into a linear motion; and
   a motor gear unit, supported by and fixed to the caliper, and configured to drive the rotary-to-linear motion conversion mechanism, wherein
   the motor gear unit is the motor gear unit for the disc brake apparatus according to claim 2.

4. The motor gear unit for the disc brake apparatus according to claim 1, wherein
   the housing further includes a second partition wall partitioning the motor accommodating portion and the brake accommodating portion.

5. A disc brake apparatus comprising:

a caliper including a cylinder on an axially inner side of a rotor;

a piston fitted into the cylinder;

a rotary-to-linear motion conversion mechanism, disposed in the cylinder, and configured to push out the piston toward the rotor by converting a rotary motion into a linear motion; and a motor gear unit, supported by and fixed to the caliper, and configured to drive the rotary-to-linear motion conversion mechanism, wherein the motor gear unit is the motor gear unit for the disc brake apparatus according to claim 4.

6. A disc brake apparatus comprising:

a caliper including a cylinder on an axially inner side of a rotor;

a piston fitted into the cylinder;

a rotary-to-linear motion conversion mechanism, disposed in the cylinder, and configured to push out the piston toward the rotor by converting a rotary motion into a linear motion; and a motor gear unit, supported by and fixed to the caliper, and configured to drive the rotary-to-linear motion conversion mechanism, wherein the motor gear unit is the motor gear unit for the disc brake apparatus according to claim 1.

7. The disc brake apparatus according to claim 6, wherein a plurality of cylinders, a plurality of pistons, and a plurality of rotary-to-linear motion conversion mechanisms are provided.

8. The disc brake apparatus according to claim 6, wherein the rotary-to-linear motion conversion mechanism includes a spindle and a nut, and the speed reduction mechanism transmits rotation of the electric motor to the spindle.

9. A motor gear unit for a disc brake apparatus, comprising:

a housing;

an electric motor;

a speed reduction mechanism; and a non-excited operation type brake, wherein the housing includes a motor accommodating portion, a gear accommodating portion, and a brake accommodating portion, and is supported by and fixed to a caliper of the disc brake apparatus, the electric motor includes a motor shaft which includes a first connection portion connected to the speed reduction mechanism on an axially one side portion and a second connection portion connected to the non-excited operation type brake on an axially another side portion, and is disposed inside the motor accommodating portion, the speed reduction mechanism is connected to the first connection portion, transmits a rotation of the electric motor to a rotary-to-linear motion conversion mechanism disposed in a cylinder of the caliper, and is disposed inside the gear accommodating portion, the non-excited operation type brake is connected to the second connection portion, prevents a rotation of the motor shaft during a non-energization period, and is disposed inside the brake accommodating portion, in a state where the disc brake apparatus is attached to a vehicle body, the motor shaft is disposed so as to be orientated in an upper-lower direction, and the non-excited operation type brake is disposed above the electric motor, and the speed reduction mechanism includes a worm connected to the first connection portion, a worm wheel meshed with the worm, a plurality of final gears connected directly or via another member to the rotary-to-linear motion conversion mechanism, and a power distribution mechanism configured to distribute and transmit an input power to the plurality of final gears.

10. The motor gear unit for the disc brake apparatus according to claim 9, wherein two final gears are provided, and an imaginary line orthogonal to a rotation central axis of each of the two final gears and the motor shaft are arranged substantially parallel to each other.

11. A disc brake apparatus comprising:

a caliper including a cylinder on an axially inner side of a rotor;

a piston fitted into the cylinder;

a rotary-to-linear motion conversion mechanism, disposed in the cylinder, and configured to push out the piston toward the rotor by converting a rotary motion into a linear motion; and a motor gear unit, supported by and fixed to the caliper, and configured to drive the rotary-to-linear motion conversion mechanism, wherein the motor gear unit is the motor gear unit for the disc brake apparatus according to claim 10.

12. A disc brake apparatus comprising:

a caliper including a cylinder on an axially inner side of a rotor;

a piston fitted into the cylinder;

a rotary-to-linear motion conversion mechanism, disposed in the cylinder, and configured to push out the piston toward the rotor by converting a rotary motion into a linear motion; and a motor gear unit, supported by and fixed to the caliper, and configured to drive the rotary-to-linear motion conversion mechanism, wherein the motor gear unit is the motor gear unit for the disc brake apparatus according to claim 9.

* * * * *